United States Patent [19]

Morikawa

[11] Patent Number: 5,021,822

[45] Date of Patent: Jun. 4, 1991

[54] IMAGE SCANNING APPARATUS HAVING EXPOSURE LAMP LIGHTING ON AT IMPROVED TIMING

[75] Inventor: Takeshi Morikawa, Osaka, Japan

[73] Assignee: Minolta Camera Kabushiki Kaisha, Osaka, Japan

[21] Appl. No.: 570,201

[22] Filed: Aug. 17, 1990

[30] Foreign Application Priority Data

Aug. 18, 1989 [JP] Japan ................................. 1-213848

[51] Int. Cl.[5] .......................... G03B 27/72; G03B 9/34

[52] U.S. Cl. ...................................... 355/69; 355/235; 355/243; 355/77

[58] Field of Search ............... 355/228, 234, 235, 243, 355/67, 69, 57, 77

[56] References Cited

U.S. PATENT DOCUMENTS 4,827,283 5/1989 Yamamoto et al. ............ 355/228 X

*Primary Examiner*—Richard A. Wintercorn
*Attorney, Agent, or Firm*—Price, Gess & Ubell

[57] ABSTRACT

An image scanning apparatus according to the present invention is directed to a copying apparatus capable of continuously copying a plurality of sheets on a record medium, including a platen on which an original is placed, an illuminating device for illuminating the original, an image forming device receiving reflected light from the original for reproducing an image of the original on the record medium, a scanning device moving in a first direction to scan the original and moving in a second direction to return to a predetermined position, a magnification specifying device for specifying a copying magnification at which the original is reproduced on the record medium, a projecting device for variable-scale magnifying the image of the original being scanned at the specified magnification to introduce the magnified image into the image forming device, a driving device for driving the scanning device and driving the scanning device to move in the first direction at different speed corresponding to the specified magnification, a first control device for making the illuminating device light on while moving in the second direction and light off when the scanning of the original is terminated, and a second control device for determining based on the specified coyping magnification a timing for the first control device to make the illuminating device light on.

23 Claims, 18 Drawing Sheets

IMAGE SCANNING APPARATUS HAVING EXPOSURE LAMP LIGHTING ON AT IMPROVED TIMING

BACKGROUND OF THE INVENTION

1. Field of the Invention

The present invention relates generally to image scanning apparatuses employed in copying apparatuses and the like and, more particularly, to an image scanning apparatus in which originals that are scanned in forward scanning of a forward and backward scanning system to be subjected to image exposure are illuminated by an exposure lamp which lights on each time the originals are scanned.

2. Description of the Related Art

An exposure lamp for illuminating originals generates a great amount of heat. Thus, when a large number of sheets are continuously copied as in recent years, a platen glass for supporting the originals to be scanned is heated dangerously up to a high temperature by the generation of heat from the exposure lamp. In order to suppress this rise in temperature, it has been conventionally structured, upon repetitive and continuous image scanning by a scanning system, that the exposure lamp once lights off each time the scanning is terminated and then lights on again upon the next scanning so as to carry out image exposure, resulting in a decrease in total time period during which the exposure lamp is lighting on in case where a large amount of copies are continuously made.

The timing at which the exposure lamp lights on again should be unobjectionable to the image exposure in view of the rising time of the lamp to a predetermined amount of light. In order to satisfy this requirement, alternative two methods have conventionally been adopted. The one is lighting on the exposure lamp again after a definite time period has passed since the scanning system completes scanning. The other method is lighting on the exposure lamp when a position sensor provided at a fixed position detects the scanning system in backward scanning.

FIG. 13A is a schematic diagram showing movement of the scanning system in case where the scanning system starts scanning; and FIGS. 13B and 13C are schematic diagrams showing movement of the scanning system with each different size of copying in case where continuous scanning starts.

Referring to FIG. 13A, the scanning system exists at a predetermined position Sx before scanning. In response to a scanning instruction, the scanning system lights on the exposure lamp and moves toward a scanning start position Ss where the originals are to be scanned. When the scanning system passes through the scanning start position Ss, the exposure lamp provides a predetermined amount of light. With the scanning terminated, the exposure lamp lights off, so that the scanning system moves in the opposite direction to the scanning direction at a return position $S_1$. When reaching a home position $S_0$, the scanning system is inverted again in the scanning direction to carry out the next scanning. In this case, the exposure lamp is required to light on upon backward scanning of the scanning system so that the amount of light generated by the exposure lamp may reach a predetermined amount in the next scanning, i.e., at the scanning start position Ss in re-scanning.

It is, however, disadvantageous to light on the exposure lamp after a definite time period has passed since the scanning system completes scanning. The position $S_1$ where the scanning system completes scanning and makes a return differs depending on the size of copying in such a case that scanning distances $s\mathbf{l}_1$ and $s\mathbf{l}_2$ are determined dependently on copying size z1 and z2 as shown in FIGS. 13B and 13C, simply in view of equal-scale magnification copying. Thus, if the exposure lamp again lights on at a position $S_2$ after a definite time period t has passed since the termination of the scanning by the scanning system, a distance provided from the time point $S_2$ when the exposure lamp again lights on to the time point when the scanning system returns to the home position $S_0$ varies as $rs_1$ and $rs_2$ according to the copying size. Accordingly, a time period required for the scanning system to reach the scanning start position Ss after the exposure lamp lights on again becomes different as $t_1$ and $t_2$, thereby to affect the amount of light generated by the exposure lamp. Therefore, even in case of the minimal copying size $z_2$ requiring the minimal time period $t_2$, the re-light-on timing of the exposure lamp need be set so as to obtain a necessary rising time for the exposure lamp upon re-lighting on. In case of the copying size $z_1$ larger than the minimal copying size $z_2$, however, the exposure lamp rises earlier to a predetermined amount of light by a time $t_3$, that is, by the difference between the minimal copying size $z_2$ and the larger copying size $z_1$, and hence the platen glass is heated excessively by extra temperature corresponding to the time $t_3$, leading to vain power consumption.

For the above-described reasons, such a method is considered that the exposure lamp again lights on when the sensor provided at a fixed position detects the scanning system under backward scanning, without being affected by the copying size.

FIGS. 14A and 14B are schematic diagrams showing the movement of the scanning system when this method is adopted. Referring to the figures, even if the scanning distance of the scanning system varies as $s\mathbf{l}_1$ and $s\mathbf{l}_2$ depending on the copying size $z_1$ and $z_2$, the exposure lamp can light on again at the position $S_2$ where a distance required for the scanning system to return to the home position $S_0$ becomes rs in common because the sensor se is at a fixed position. This eliminates such inconveniences as given in the above-described conventional example.

However, the scanning system moves at different scanning speed sv depending on copying magnification. When circumferential speed (system speed) of a photoreceptor to be subjected to the image exposure by the scanning system is represented by v, an equation $sv=v/n$ (n: copying magnification) is obtained. The scanning speed is 2v in a contraction where magnification n is ½, whereas it is v/2 in an enlargement where magnification n is 2. Accordingly, as shown in FIGS. 13A and 13B, even if the exposure lamp again lights on at the position $S_2$ where the scanning system gains a definite distance rs from home position $S_0$, a time period $ts_1$, $ts_2$ required at least when the scanning system returns to home position $S_0$, then moves forward for the subsequent scanning and reaches the scanning start position Ss becomes $ts_1 \neq ts_2$ in FIGS. 14A and 14B because of different scanning speed, provided that there is a difference in copying magnification processing between FIGS. 13A and 13B. Consequently, there is no other way then setting the re-light-on timing of the exposure lamp by the sensor se so as to obtain a necessary rising time for the exposure lamp upon re-lighting on in case of the minimal magnification corresponding to the minimal required time, e.g., $ts_1$. In addition, in case of a magnification larger than the minimal magnification, the exposure lamp rises earlier to a predetermined amount of light by the time corresponding to the difference in magnification, and hence the platen glass is heated excessively and the power is vainly consumed.

As described above, the conventional canning apparatus is still disadvantageous with respect to the extra heating of the platen glass and the vain power consumption. Meanwhile, the backward scanning speed of the scanning system is increasingly enhanced for achieving still higher speed of operation, resulting in a decreased opportunity for the exposure lamp to light off. Therefore, it is indispensable to avoid the extra increase in temperature and vain power consumption.

SUMMARY OF THE INVENTION

One object of the present invention is to efficiently light on an exposure lamp in an image scanning apparatus.

Another object of the present invention is to reduce power consumption of an exposure lamp in an image scanning apparatus.

A further object of the present invention is to reduce influences caused by generation of heat from an exposure lamp in an image scanning apparatus.

In order to achieve the above objects, according to one aspect, an image scanning apparatus in accordance with the present invention is directed to a copying apparatus capable of copying a plurality of sheets continuously on a record medium and includes original holding means having a platen on which an original is to be placed, illuminating means for illuminating the original, image forming means receiving reflected light from the original to reproduce an image of the original on the record medium, scanning means moving in a first direction for scanning the original and moving in a second direction for returning to a predetermined position, magnification specifying means for specifying copying magnification for reproducing the original on the record medium, projection means for variable-scale magnifying the image of the original being scanned in a specified magnification so as to introduce the magnified image into the image forming means, driving means for driving the scanning means to scan and then move in the first direction at different speed corresponding to the specified magnification, first control means for lighting on the illuminating means under the movement in the second direction and lighting off the illuminating means when the scanning of the original is terminated, and second control means for determining from the specified copying magnification a timing at which the first control means lights on the illuminating means.

In order to achieve the above objects, according to another aspect, the image scanning apparatus in accordance with the present invention is directed to an image scanning apparatus capable of projecting an original in a plurality of magnifications onto a projection surface and capable of continuously scanning the original and includes a platen on which the original is to be placed, illuminating means for illuminating the original by lighting on in response to a scanning start instruction, scanning means capable of scanning the original at different speed, a first speed and a second speed, moving means having a first moving mode for moving the scanning means to scan the original and a second moving mode for returning the scanning means to a predetermined position, detecting means for detecting a moving position of the scanning means, first control means for lighting off the illuminating means when the scanning is terminated and lighting on the illuminating means again when the scanning means reaches a first position while moving in the second moving mode, with the original being set to be scanned at the first speed, and second control means for lighting off the illuminating means when the scanning is terminated and lighting on the illuminating means again when the scanning means reaches a second position different from the first position while moving in the second moving mode, with the original being set to be scanned at the second speed.

The image scanning apparatus thus structured controls a timing at which the exposure lamp lights on, based on copying magnification or scanning speed, whereby the lighting of the exposure lamp can efficiently be carried out.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
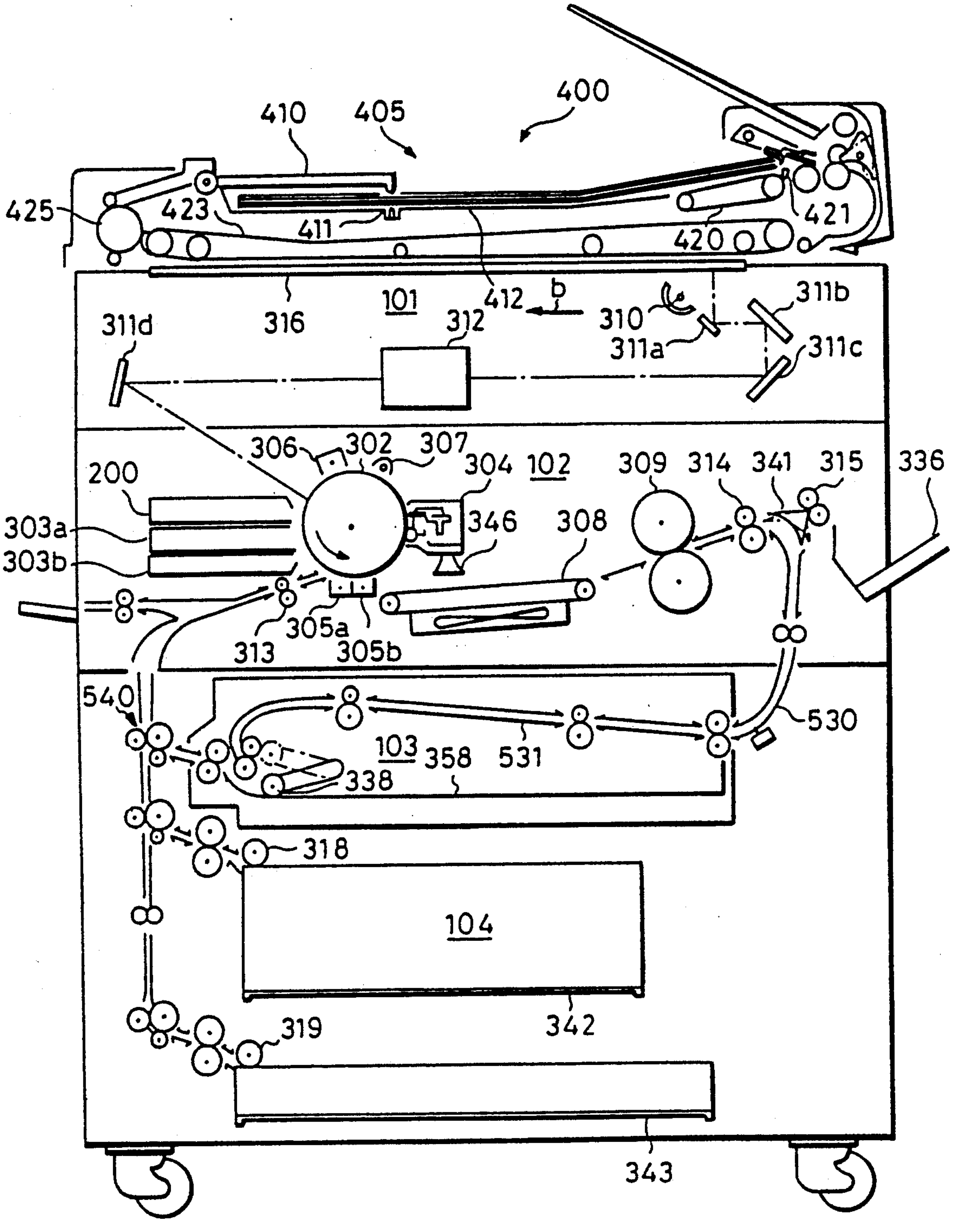
FIG. 1 is a diagram showing a schematic structure of a copying apparatus according to one embodiment of the present invention.

FIG. 1 is a schematic diagram showing the structure of a copying apparatus and of a recirculatory document handler (RDH) according to one embodiment of the present invention.

Referring to FIG. 1, the copying apparatus comprises an optical system 101 in upper part, an image forming portion 102 in middle part, a paper re-feeding unit 103 in lower part, a paper feeding unit 104 in bottom part and a recirculatory document handler 400 set on a platen 316. Recirculatory document handler 400 continuously feeds originals set on a document tray 412 onto platen 316 from the right end of FIG. 1, then transports the fed originals to the left and thereafter collects the originals again onto document tray 412. The document handler 400 is employed to be set on platen 316 of the copying apparatus. Two manners of using document handler 400 are available: planning mode and non-planning mode (ADF mode).

The originals are fed by recirculatory document handler 400 in the following manner. First, the originals set on document tray 412 with their imaging planes facing upward (in a stacked manner) are drawn out in turn form the one at the bottom and then fed onto platen 316. The feeding of the originals is detected by a paper feed detecting sensor 421.

(i) In first mode, after a predetermined timing is set at an entrance of the platen (at the right end of FIG. 1) the originals are transported at a definite speed on platen 316 to the left by friction caused by a transport belt 423 and then undergo exposure scanning.

At this time, an exposure lamp 310 and reflecting mirrors 311*a*, 311*b* and 311*c* of optical system 101 are held to be fixed at reference positions.

That is to say, the exposure scanning of images of the originals in first mode is not carried out by movement of the optical system but by movement of the originals. Then, the originals are discharged by a discharge roller 425 through an exit of the platen (at the left end of the figure) and then collected onto document tray 412 again.

Further, the transport speed of the originals on platen 316 is altered depending on copying magnification.

(ii) In second mode (the mode in which the recirculatory document handler is used as an auto document feeder (ADF); ADF mode), the originals which have passed through the position of paper feed detecting sensor 421 are first stopped at a definite position on platen 316 (a position for executing the scanning of the originals by movement of a scanner).

In such a state that the originals are stopped, exposure lamp 310 and reflecting mirror 311*a* of optical system 101 are driven at a speed of V/N, while reflecting mirrors 311*b* and 311*c* are driven at a speed of V/2N. The driven exposure lamp 310 and reflecting mirrors 311*a*, 311*b* and 311*c* move along the lower surface of platen glass 316 to subject the originals to exposure scanning.

Figure 2A:
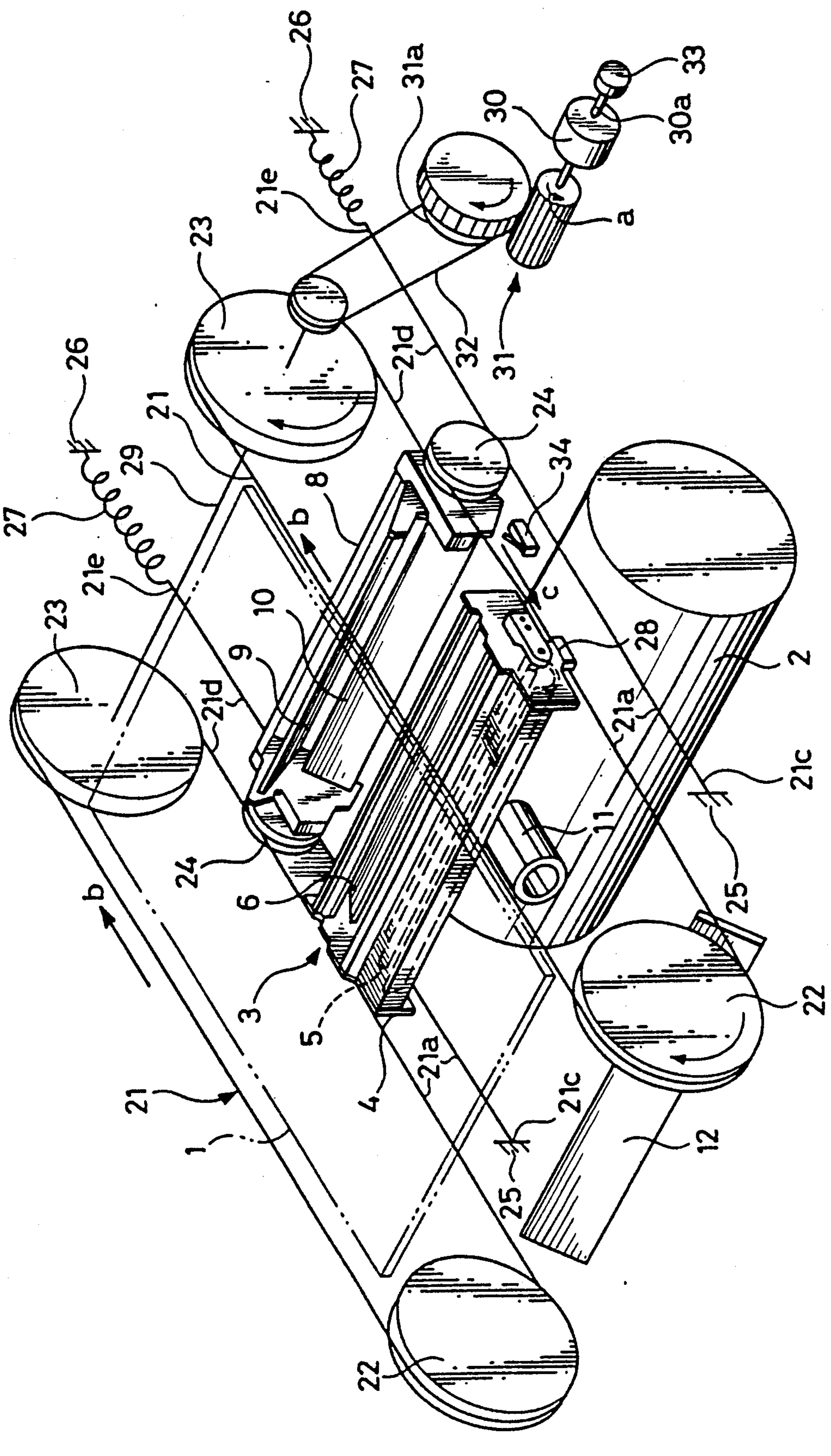
FIG. 2A is a perspective view of an image forming portion in an optical moving-type copying apparatus according to one embodiment of the present invention.

FIG. 2A shows a schematic structure of an image forming portion in the copying apparatus. A scanning optical system 3 is provided between a platen glass 1 and a photoreceptor drum 2 under the platen glass. Scanning optical system 3 comprises an exposure lamp 5 and a first mirror 6 held on a first moving board 3 serving as a scanner, second and third mirrors 9 and 10 held on a second moving board 8, and a projection lens 11 and a fourth mirror 12.

A pair of drive wires 21 are provided at opposite ends of a portion where the first and second moving boards 4 and 8 move. Each drive wire 21 extends over between pulleys 22 and 23 of the same diameter provided distantly from each other on the left and the right. A portion 21*a* of drive wire 21 on the pulley 22 side extends around the lower side of pulley 22 and then around a pulley 24 provided at an external surface of an end plate of second moving board 8, and is then wound back around pulley 24, with an end 21*c* thereof fastened on a fixing member 25. A portion 21*d* of drive wire 21 on the pulley 23 side extends around the lower part of pulley 23 and then around pulley 24 on second moving board 8, and is wound back around the pulley, with an end 21*e* thereof fastened on a fixing member 26 through a tension spring 27.

Portion 21*a* of each drive wire 21 on the pulley 22 side is mounted on a fastening portion 28 of first moving board 4 at a part between pulleys 22 and 24. A DC motor 30 is connected to an axis 29 of rotation of pulley 23 through a reduction gear 31 and a timing belt 32. An encoder 33 is connected to an axis 30*a* of rotation of motor 30 to generate pulses having width corresponding to the rotation of motor 30.

Figure 2B:
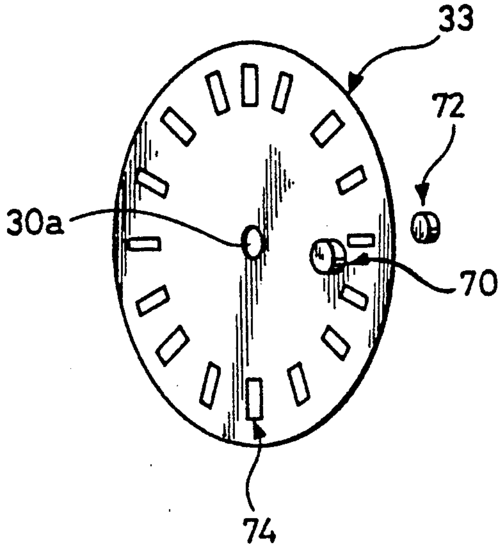
FIG. 2B is a perspective view showing a schematic structure of an encoder shown in FIG. 2A.

FIG. 2B is a perspective view showing a detailed structure of the encoder. Referring to FIG. 2B, a plurality of openings 74 are formed with a predetermined spacing from each other in the direction of circumference on disc-shaped encoder 33 fixed on rotary axis 30*a*. A light emitting element 70 and a light receiving element 72 are mounted at a position corresponding to an opening 74, with encoder 33 interposed therebetween. With the encoder thus structured, one pulse is generated every time opening 74 passes in front of light emitting element 70 in accordance with the rotation of the motor.

When motor 30 operates in the direction of an arrow a, wire 21 is driven in the direction of an arrow b. At this time, first moving board 4 directly fastened to wire 21 moves in the direction of an arrow c at a speed of 1/n (n: copying magnification) which is the same speed as wire 21. Images of the originals on platen glass 1 are scanned in a range corresponding to copying size and copying magnification and then sequentially exposed in a slit manner on photoreceptor drum 2 by first to fourth mirrors 6, 9, 10 and 12 and projection lens 11. Second moving board 8 is moved at a speed of ½n in the direction of arrow c through pulley 24 by the movement of portion 21*d* of wire 21 on the pulley 23 side becoming longer by a length corresponding to portion 21*a* on the side of pulley 22 side becoming shorter when wire 21 is driven in the direction of arrow b. Thus, an optical path length of scanning optical system 3 under scanning is kept constant.

Around photoreceptor drum 2 are provided an eraser lamp, a corona charger, a developing device, a transfer charger and a cleaning device (None of them shown). When subjected to the exposure, an electrostatic latent image is formed on a surface of photoreceptor drum 2 which is uniformly charged by the corona charger.

This electrostatic latent image is developed by the developing device to become a toner image and then transferred by the transfer charger onto a transfer member which is to be transmitted in synchronization with the toner image.

From the surface of photoreceptor drum 2 after the transfer, a residual toner is removed by the cleaning device and then a residual charge is removed by the eraser lamp.

Alteration of copying magnification is carried out by, for example, moving projection lens 11 or the like along an optical axis to adjust an optical path length.

Motor 30 is reversely rotated at the time point when the scanning is terminated. This causes wire 21 to be driven in a direction opposite from the direction of arrow b and causes first and second moving boards 4 and 8 to move in a direction opposite from the direction of arrow c to return to a home position.

Figure 3:
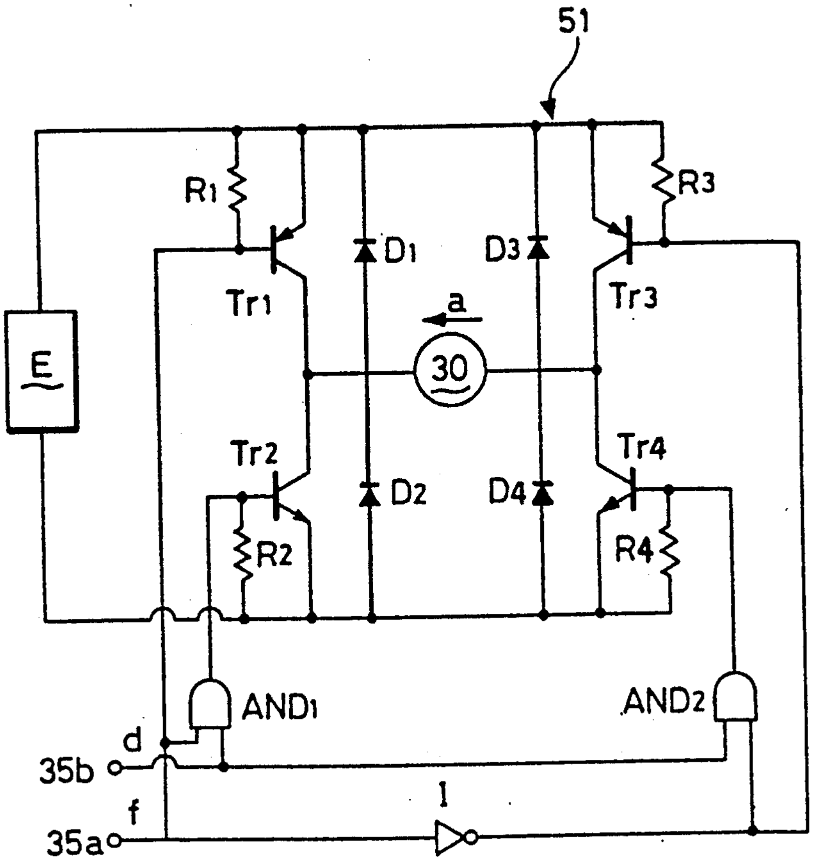
FIG. 3 is a driving circuit diagram of a drive motor of a scanning optical system according to one embodiment of the present invention.

For controlling the operation of scanning optical system 3, motor 30 is driven by a driving circuit shown in FIG. 3 and controlled by a controlling circuit shown also in FIG. 3. In addition, a switch 34 for detecting whether scanning optical system 3 is at home position for this control is provided along a moving path of first moving board 4. Switch 34 is pressed to operate when first moving board 4 is at home position.

The driving circuit of FIG. 3 will now be described. A DC power source E is connected to motor 30 through four switching transistors Tr1–Tr4 bridge-connected. Transistors Tr1 and Tr3 turn on when a base voltage is at a low level, while transistors Tr2 and Tr4 turn on when the base voltage is at a high level. According to combinations of ON and OFF states of these transistors, motor 30 is appropriately rotated regularly or reversely, or alternatively stopped.

Diodes D1–D4 are connected in parallel to transistors Tr1–Tr4, respectively, thereby to form a by-pass required when a counter electromotive voltage is produced.

An input terminal **35*a* to which a signal of the high level as a normal rotation signal or a signal of the low level as a reverse rotation signal is provided is connected to an input of an AND gate AND1 and to a base of transistor Tr1 and also connected through an inverter 1 to an input of an AND gate AND2 and to a base of transistor Tr3**.

Another input terminal **35*b* to which a signal of the high level as a turn-on signal caused by a pulse d for rendering the motor electrically conductive, or alternatively a signal of the low level as a turn-off signal is provided is connected to the inputs of the respective AND gates AND1 and AND2. An output of AND gate AND1 is connected to a base of transistor Tr2, while an output of AND gate AND2 is connected to a base of transistor Tr4**.

Table 1 shows the ON and OFF state of each of transistors Tr1–Tr4 according to the combination of input signals to be applied to each of input terminals **35*a* and 35*b*, the ON and OFF state of motor 30 depending on the ON and OFF state of the transistors and the normal/reverse rotation in the ON state of motor 30**.

TABLE 1

| Input terminals | | Transistors | | | | |
|---|---|---|---|---|---|---|
| 35a | 35b | Tr1 | Tr2 | Tr3 | Tr4 | Motor 30 |
| Low level (L) | L | ON | OFF | OFF | OFF | OFF |
| High level (H) | L | OFF | OFF | ON | OFF | OFF |
| L | H | ON | OFF | OFF | ON | ON (reverse rotation) |
| H | H | OFF | ON | ON | OFF | ON (normal rotation) |

Figure 4:
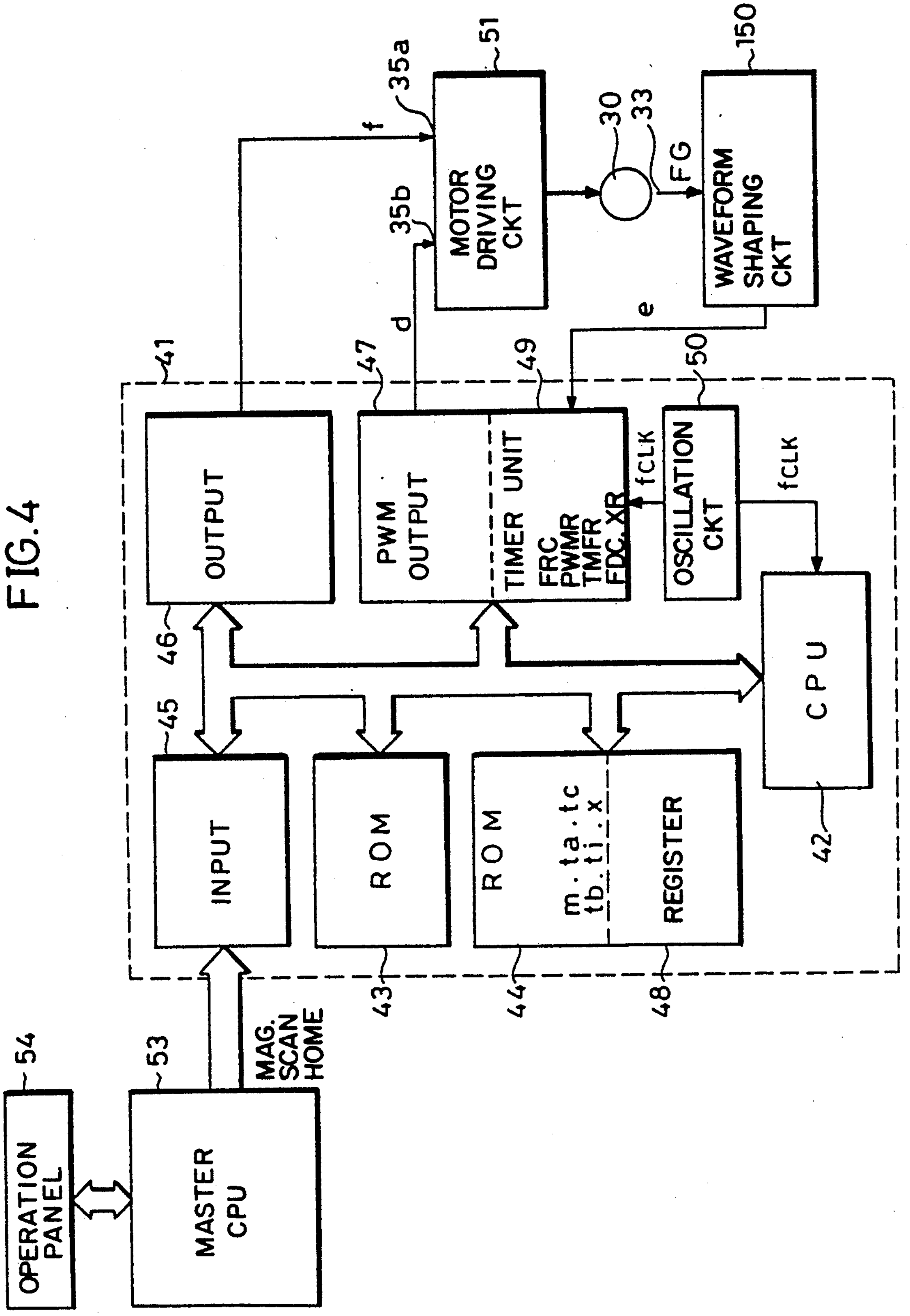
FIG. 4 is a diagram of a control circuit for controlling the driving circuit according to one embodiment of the present invention.

A description will now be given on a control circuit of FIG. 4. This circuit includes a one-chip microcomputer 41 which is dedicated to control of scanning optical system 3. This one-chip microcomputer 41 is controlled by a microcomputer 53 (hereinafter referred to as a master CPU) for controlling other numerous operations of the copying apparatus. Master CPU 53 is provided with various scanning instructions through an operation panel 54.

Microcomputer 41 comprises a CPU 42, an ROM 43, an RAM 44, an input port 45, an output port 46, a PWM output port 47, a register 48, a timer unit 49, and an oscillation circuit 50 for generating an internal system clock $f_{CLK}$. Timer unit 49 comprises a counter XF for counting an encoder pulse e as position information of first moving board 4 and a frequency demultiplier circuit FDC for four-demultiplying an input of encoder pulse e to generate an interruption during returning of first moving board and for causing counter XF to count four by four every time the interruption is generated. Accordingly, even if the motor becomes electrically conductive with full power to rotate at a high speed during return operation, counter XF does not have to count until an edge of encoder pulse e is detected four times, thereby enabling a control processing during that time period. An output FG from an encoder 33 is converted to a rectangular wave in a waveform shaping circuit 150 and then provided to microcomputer 41 as encoder pulse e.

Input port 45 is supplied with a photographing magnification signal MAG, a signal SCAN for requesting the start of scanning and a signal HOME for indicating whether or not scanning optical system 3 is at home position, from master CPU 53. Signal MAG indicates copying magnification to be selected through operation panel 54 in the copying apparatus. Scanning speed is set in microcomputer 41 in correspondence with signal MAG. Signal SCAN is normally at the low level, while it attains the high level when requesting the start of scanning. Signal HOME attains the high level only when scanning optical system 3 is at home position, while it attains the low level in the other cases.

Figure 5:
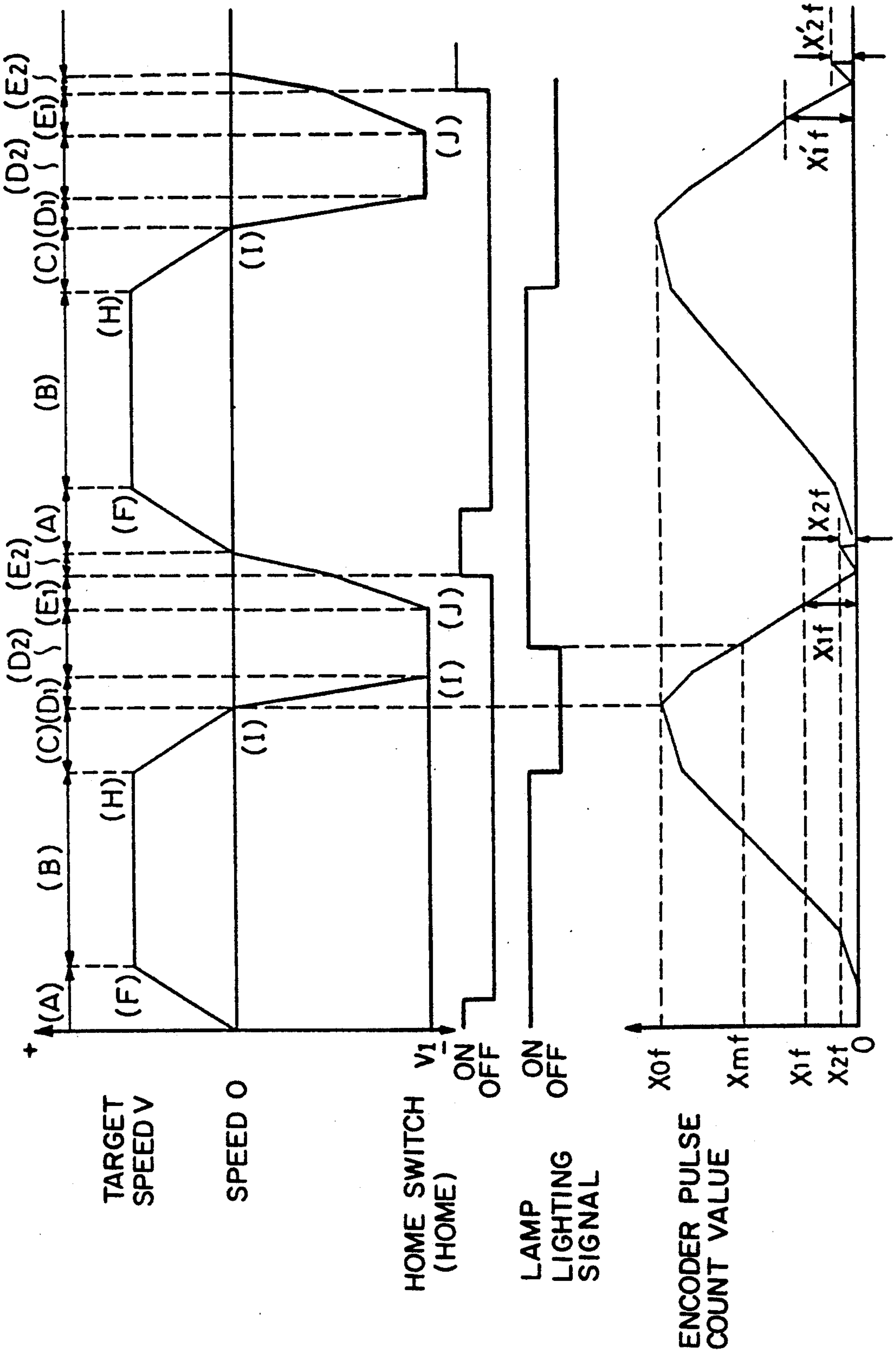
FIG. 5 shows a scanning line diagram of a first moving board for scanning, a time chart of a home switch corresponding thereto and a line diagram of count variation of an encoder pulse, according to one embodiment of the present invention.

Output port 46 provides a normal/reverse rotation signal f of motor 30, which is then supplied to input terminal **35*a* of driving circuit 51 of FIG. 3. PWM output port 47 provides a PWM motor electrically conducting pulse d for constant speed scanning control, the frequency of which is obtained by 256-demultiplying system clock $f_{CLK}$ oscillated by oscillation circuit 50 or a PWM motor electrically conducting pulse d, duty of which pulse is set to 100% for performing an acceleration scanning control before the constant speed scanning control of scanning system 3, a deceleration scanning control after the constant speed scanning control, an acceleration return control and a deceleration return control thereafter. The pulse d is outputted from output port 46 as a pulse which is controlled for an OFF time period by an interruption carried out by a timer setting based on each of ON and OFF edges of encoder pulse e (FIG. 5). This outputted pulse d is supplied to input terminal 35***b* of driving circuit 51 of FIG. 3. These inputs enable controlling of motor 30.

This control includes, as shown in FIG. 5 in detail, a control in an acceleration scanning A state before scanning optical system 3 reaches a target speed V from a speed 0, a control in a constant speed scanning B state where scanning optical system 3 scans a predetermined range at a constant speed with target speed V attained, a control in a deceleration scanning C state where motor 30 is once decelerated down to speed 0 in order to make scanning optical system 3 move backward when the constant speed scanning is terminated, a control in an acceleration return D1 state where motor 30 is subsequently reversely rotated with acceleration to acceleratedly move scanning optical system 3 backward, a control in a constant speed return D2 state where scanning optical system 3 is returned at a constant speed V1 when scanning optical system 3 backward reaches the target speed V1, and a control in a state of first and second deceleration returns E1 and E2 where motor 30 is decelerated down to speed 0 and then stopped by application of a break in order to make scanning optical system 3 in the constant speed return D2 state stop at home position.

Figure 6A:
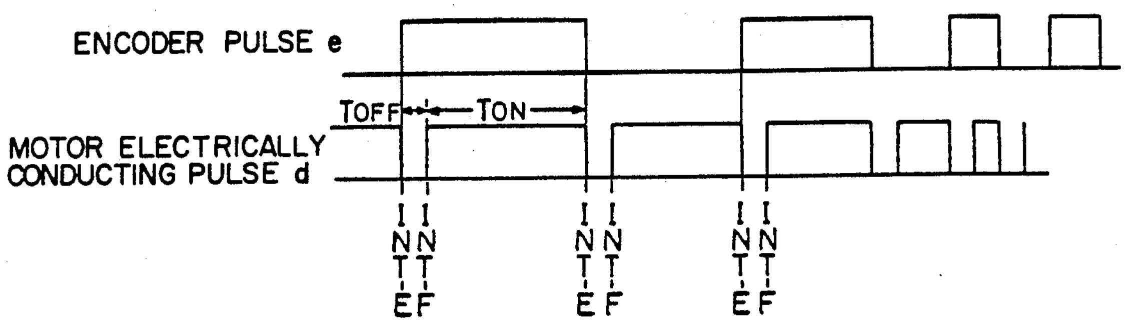
FIGS. 6A–6G are line diagrams showing an encoder pulse and an electrical conduction signal responsive to the encoder pulse at each control time point during forward and backward movement of the first moving board according to one embodiment of the present invention.

In the control of acceleration scanning A, input terminal 35*a* is provided with a signal of the high level. Input terminal 35*b* is provided with pulse d which is obtained by timer-setting a definite OFF time $t_{OFF}$ from each of ON and OFF edges of the encoder pulse to be generated in accordance with the rotation of motor 30 and setting an ON time $t_{ON}$ as a time period to each of ON and OFF edges of the next encoder pulse (FIG. 6A).

This electrical conduction pulse d is obtained by an internal interruption INT-F which is timer-set from an interruption INT-E by each of ON and OFF edges of encoder pulse e. The rotation of motor 30 is slow and the spacing of encoder pulse e is large in the initial period of acceleration scanning A. Motor 30 is highly accelerated by a storing electrically conductive torque because ON time $t_{ON}$ of motor 30 is sufficiently long compared to OFF time $t_{OFF}$. As the speed becomes close to the target speed V for constant speed scanning B, the spacing of encoder pulse e becomes smaller and the ratio of ON time $t_{ON}$ to OFF time $t_{OFF}$ becomes decreased, whereby the acceleration for driving motor 30 becomes gradually reduced.

When the speed reaches an F point of FIG. 5 which is to be the target speed V, microcomputer 41 determines that the speed reaches the target speed V based on the spacing of encoder pulse e. This determination is made in AND condition where the width of the present pulse e is smaller than that of the previous pulse e, i.e., the acceleration is underway, and the width of pulse e is equal to or less than a predetermined width corresponding to the target speed V or more. Accordingly, even if there is a pulse having a small width which is sometimes generated depending on a position where encoder 33 has stopped during the initial acceleration of motor 30, no determination is made that the acceleration is underway, and hence an erroneous determination can be avoided that the width of the pulse becomes correspondent to a predetermined speed or more. In this manner, a correct determination is made as to whether the speed reaches the target speed V.

Figure 7A:
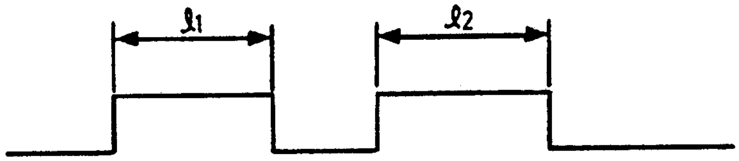
FIG. 7 is a diagram showing the difference in acceleration between a case where a motor is rendered electrically conductive and a case where the motor is rendered non-conductive during the forward and backward movement of the first moving board according to one embodiment of the present invention.
Figure 7B:
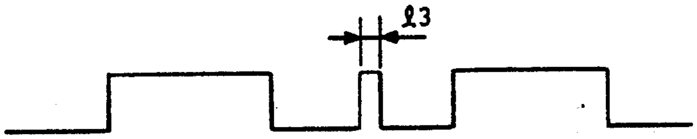

When it is determined that the speed reaches the target speed V, the control of motor 30 changes to the control of constant speed scanning B in response to the determination. In this control, motor 30 is controlled at a constant speed with the PWM pulse employed as the pulse d for rendering the motor electrically conductive; however, as will be described in detail later, an acceleration $\alpha_{ON}$ in the electrical conduction state and an acceleration $\alpha_{OFF}$ in the non-conduction state which are obtained when the speed reaches the target speed V are evaluated, and thereafter the duty of the pulse d for rendering the PWM motor electrically conductive is re-written for each encoder pulse, with those two accelerations $\alpha_{ON}$ and $\alpha_{OFF}$ employed as parameters (FIG. 7).

Figure 6B:
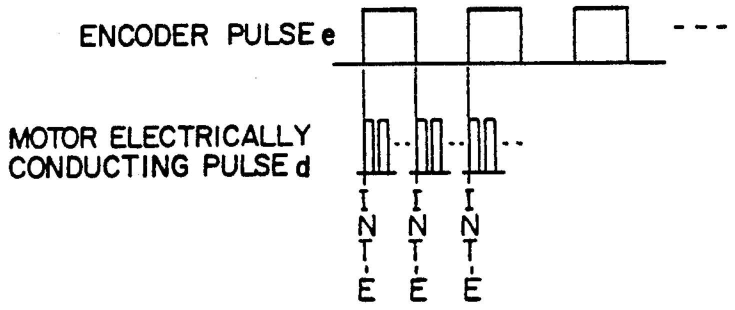
Figure 6C:
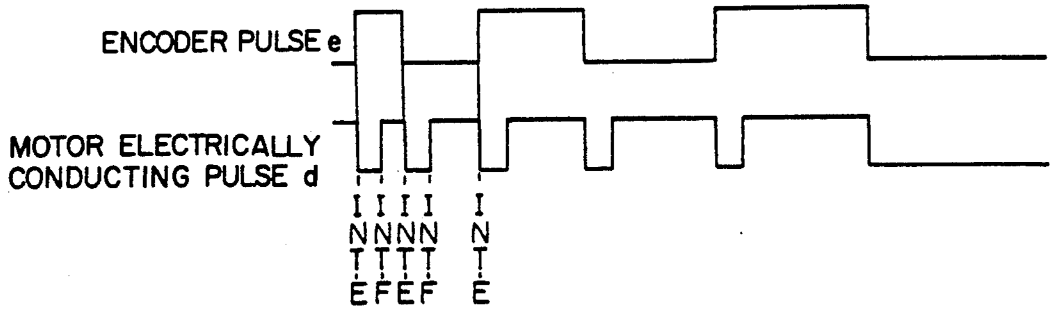

Timing for rewriting the duty is obtained only by the interruption INT-E due to each of ON and OFF edges of encoder pulse e (FIG. 6B). Accordingly, the internal interruption INT-F is prohibited during that time period. This results in attainment of constant speed scanning B, and when scanning optical system 3 reaches a position where effective scanning is terminated, deceleration scanning C is carried out. In this deceleration scanning C, input terminal 35*a* is changed to the low level since a damping force is applied to the motor, and a control of the OFF time is carried out by the pulse d similarly to the case of acceleration scanning A (FIG. 6C). In a state where input terminals 35*a* and 35*b* are both at the low level, only transistor Tr1 is turned on in FIG. 3. Since scanning optical system 3 is moving in the direction of scanning at this time, the axis 30*a* of motor 30 is rotated by this movement, and a counter electromotive voltage which is in the opposite direction to the arrow a is generated in a closed loop of motor 30, diode D3 and transistor Tr1, so as to apply a damping force to the rotation of motor 30 rotating in a scanning direction a. This is a so-called regenerative brake.

Meanwhile, in a state where input terminal 35*a* is at the low level and input terminal 35*b* is at the high level, transistors Tr1 and Tr4 are turned on, so that a current from DC power source E flows in the opposite direction to the arrow a, so as to apply a damping force to rotate motor 30 in a return direction. Such a case that motor 30 is driven in the opposite direction from the moving direction of scanning optical system 3 to apply a damping is so-called forcible braking.

At the initial stage of deceleration scanning C of FIG. 5, the spacing of encoder pulse e is shorter than the set OFF time, and hence only the regenerative brake acts. A damping force applied by this regenerative brake is comparatively weak, so that scanning optical system 3 becomes gradually decelerated. When the spacing of encoder pulse e becomes longer than the OFF time with deceleration enhanced, the forcible brake acts together with the regenerative brake, so that deceleration is carried out under strong damping.

When microcomputer 41 then determines that the width of encoder pulse e becomes larger than the width corresponding to the target speed V1, an acceleration return processing of D1 in FIG. 5 takes place. This determination by microcomputer 41 is made under AND condition of a case where the width of the present pulse e is larger than that of the previous pulse e, i.e., the deceleration is underway, and a case where a detection is made as to whether or not the width of pulse e becomes equal to or larger than the width corresponding to the speed obtained immediately before motor 30 stops, or alternatively, whether or not a short pulse is produced due to a position where encoder 33 is inverted 33 and acceleration after the inversion which results from inversion of motor 30. Therefore, motor 30 is turned off by a determination as to whether the deceleration control causes motor 30 to attain a predetermined decelerated speed immediately before the motor stops or causes motor 30 to be inverted. This makes it possible to adequately transfer to the next acceleration return D1 without reckless driving of motor 30 due to an erroneous determination caused by the short pulse.

Figure 6D:
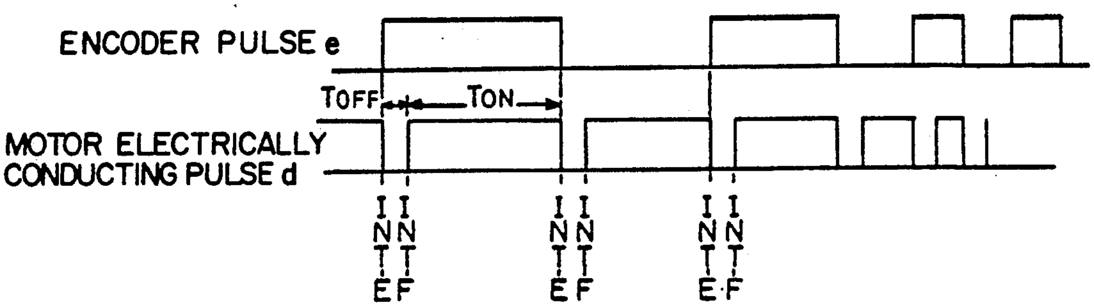
Figure 6E:
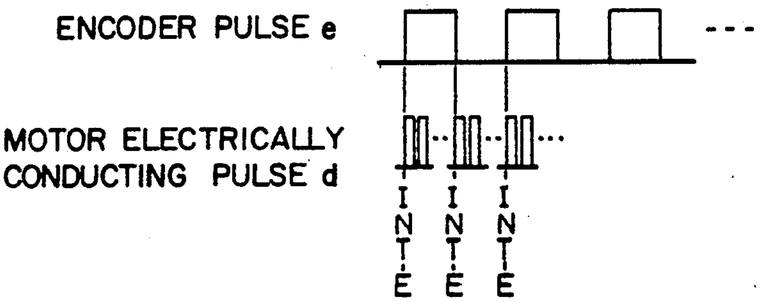
Figure 6F:
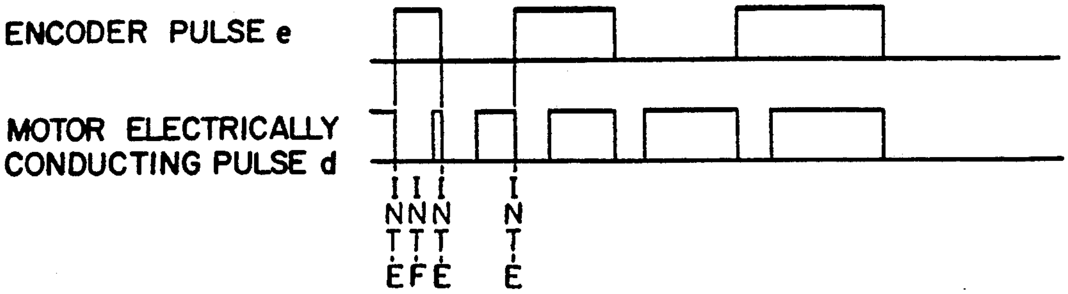
Figure 6G:
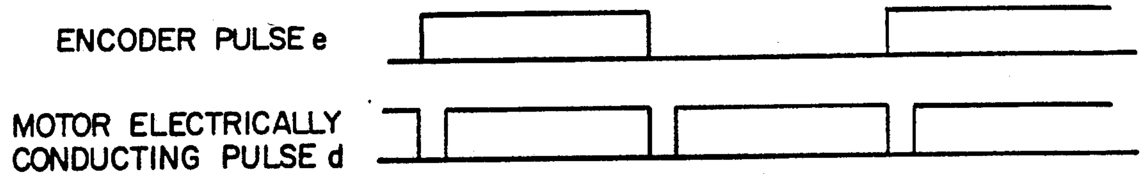

Acceleration return D1 is kept being carried out until the speed reaches the target speed V1 by the control of the OFF time similarly in the case of acceleration scanning A. When microcomputer 41 determines that the speed reaches the target speed V1 similarly to the case of acceleration scanning A, the control is changed to a constant speed return D2 to be carried out under the same control as the constant speed scanning B (see FIGS. 6D and 6E).

Now, scanning optical system 3 is required to stop precisely at home position by those returns. In order to satisfy this requirement, a time point when a first deceleration return E1 starts is determined by evaluation of an actual position of scanning optical system 3.

This will now be described as follows. Counter XF in timer unit 49 keeps counting encoder pulse e from a time point when the home switch is turned off in response to the start of scanning. During the return from a time point I of FIG. 4 when the scanning is terminated, the position of first moving board 4 under the return is evaluated by subtraction of a count value x0f obtained so far. Timing at which first deceleration return E1 starts is determined according to the fact that the value reaches a count value x1f corresponding to a distance from home switch 34 to a predetermined position where braking starts (J of FIG. 5) which is in front of the home switch.

The subtraction at this time is carried out four by four every time each of ON and OFF edges of encoder pulse e is detected four times to generate the above-described external interruption, as described above.

When the count value becomes x1f, first deceleration return E1 is carried out by the regenerative braking under the control of the OFF time similarly to the initial state of deceleration scanning C. This count value x1f is corrected for each scan according to a moving distance (x2f with respect to count value of encoder pulse e) provided from when home switch 34 is turned on to when scanning optical system 3 stops, so that the count value x1f becomes x'1f upon return in the next scanning.

When scanning optical system 3 reaches home position (the count value of encoder pulse e is 0) by first deceleration return E1, a forcible brake is applied under control of the OFF time similarly to a state after the halfway of deceleration scanning C, so as to stop scanning optical system 3 and also count the above-described value x2f.

A detection of the stop of the scanning system for a transfer to the completion of return control and to the next acceleration scanning A is carried out similarly to the foregoing case of the transfer from deceleration scanning C to acceleration return D1.

A detailed description will be given on the above-described main controls. Timer unit 49 of microcomputer 41 counts a four-demultiplied system clock $f_{CLK}$ which is supplied from oscillation circuit 50 by a free-run counter FRC of the timer unit, as a reference clock, and generates an external interruption signal INT-E by detection of both of ON and OFF edges of encoder pulse e. Then, time unit 49 captures a value of free-run counter FRC obtained at a detection time point into a register 48, and determines the pulse width of encoder pulse e based on that count value to provide information of detecting speed of motor 30.

Assuming that the reduction ratio of reduction gear 31 is 1/N, the diameter of driving pulley 31*a* is D, and a scanning speed $V_P$ obtained in equal-scale magnification by motor 30 is regarded as the speed of timing belt 32, the relation between the number of revolutions $R_O$ and the speed $V_P$ of motor 30 is shown below.

$$R_O = \frac{V_p \cdot N}{D \cdot \pi} \tag{1}$$

Assuming that the width of the encoder pulse (one period) in equal-scale magnification is TSI, and the number of encoder pulses per revolution of motor 30 is G (e.g., G=50), the following expression is given.

$$TSI = \frac{1}{GR_O} \tag{1'}$$

Timer unit 49 then generates and outputs a high level active pulse corresponding to a valve set in a PWM register PWMR included in the time unit at frequencies obtained by 256-demultiplying the system clock $f_{CLK}$. The resolution of this PMW is $2^{12}$, and the duty of the pulse width PWMduty is expressed as below.

$$PWM\text{duty} = \frac{\text{Value of } PWMR}{2^{12}} \times 100(\%) \tag{2}$$

Further, timer unit 49 causes a TMF register TMFR to count a value set in the register and then generates the above-described internal interruption signal INT-F.

A description will now be given on the constant speed scanning B control by PWM output port 47. When the difference between acceleration $\alpha_{ON}$ in case where motor 30 is rendered electrically conductive by the electrical conduction pulse d and acceleration $\alpha_{OFF}$ in case where the electrical conduction of the motor is interrupted with respect to the target speed V is ΔV as shown in FIG. 7, the following equation is given:

$$\alpha_{ON} Y \cdot T_p - \Delta V = \alpha_{OFF}(1-Y)T_P \tag{3}$$

where $T_P$ is one period of PWM motor electrical conduction pulse d, and Y is the ratio of the ON time to $T_P$, in order to attain the target speed V during one period of the pulse d. Accordingly, Y is evaluated as follows.

$$Y = \frac{\alpha_{OFF}}{\alpha_{ON} + \alpha_{OFF}} + \frac{\Delta V}{T_p(\alpha_{ON} + \alpha_{OFF})} \tag{4}$$

Figure 8:
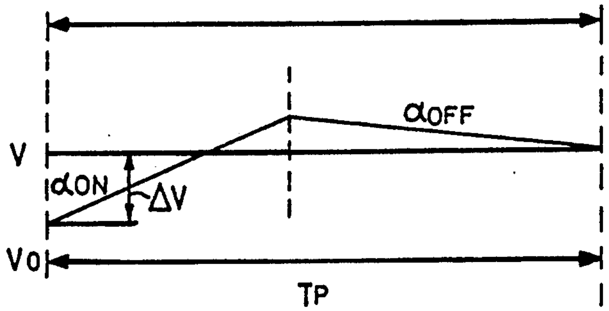
FIG. 8 is a line diagram for explaining a method of setting duty in one period of a pulse for rendering a PWM motor electrically conductive according to one embodiment of the present invention.

Next, such a case will not be considered that the external interruption INT-E of the encoder is generated at the time of $K_0$ in FIG. 8. It is now assumed that speed error is ΔV. In order to attain the target speed V before time $K_1$ when the next external interruption INT-E of the encoder is generated, where one period of an encoder pulse corresponding to the target speed V is TSI, a time period from $K_0$ to $K_1$ approximates TSI/2, and the number N of the PWM motor electrical conduction pulses d during that time period is shown by the following equality.

$$N = \frac{TSI}{2} \times \frac{1}{T_p} \tag{5}$$

Therefore, a value obtained by N-dividing the speed error ΔV provided in equality (4) may be corrected by controlling the duty of one PWM motor electrical conduction pulse d. ON ratio Y of the electrical conduction pulse d in this case is evaluated as below.

$$Y = \frac{\alpha_{OFF}}{\alpha_{ON} + \alpha_{OFF}} + \frac{2 \cdot \Delta V}{(\alpha_{ON} + \alpha_{OFF}) \cdot TSI} \tag{6}$$

With regard to speed error ΔV, detection of speed is carried out by determining the width of encoder pulse e based on the count number of free-run counter FRC which is provided during the external interruptions INT-E. In case where a pulse width measured at time point $K_0$ is $TM_{ON}$, and a target pulse width is TSI, as shown in FIG. 8, the speed V provided when the pulse width is TSI is evaluated by $R_0$ in equalities (1) and (1') and by G and $V_P$ as follows.

$$V = \frac{1}{TSI} \cdot \frac{V_p}{GR_0} \tag{7}$$

Similarly, when the speed error is ΔV, speed $V_0$ is evaluated in the following equality (8) where $TM_{ON}$ denotes the pulse width.

$$V_0 = \frac{1}{TM_{ON}} \cdot \frac{V_p}{GR_0} \tag{8}$$

Accordingly, the speed error ΔV is expressed as below.

$$\Delta V = V - V_0 = \frac{TM_{ON} - TSI}{TM_{ON} \cdot TSI} \cdot \frac{V_p}{GR_0} \tag{9}$$

The ON ratio of the pulse d is evaluated from equality (6) as follows.

$$Y = \frac{\alpha_{OFF}}{\alpha_{ON} + \alpha_{OFF}} + \frac{2}{\alpha_{ON} + \alpha_{OFF}} \cdot \frac{1}{TSI^2} \cdot \frac{V_p}{GR_0} \cdot \frac{TM_{ON} - TSI}{TM_{ON}} \tag{10}$$

Where $TM_{ON}$=TSI in a denominator of the second term on the right side in the above equality (10), ON ratio Y of the pulse d is evaluated from equality (10) as follows.

$$Y = \frac{\alpha_{OFF}}{\alpha_{ON} + \alpha_{OFF}} + \frac{2}{\alpha_{ON} + \alpha_{OFF}} \cdot \frac{1}{TSI^3} \cdot \frac{V_p}{GR_0} \cdot (TM_{ON} - TSI) \tag{11}$$

The width of encoder pulse e is determined by a counting performed by free-run counter FRC in CPU 42. Since free-run counter FRC counts a four-demultiplied system clock $F_{CLK}$ as a reference clock, the following equality (12) is given where $TM_{ON}$ and TSI in the second term on the right side of equality (11) are represented by count values $TM_{ON}f$ and TSIf of free-run counter FRC, respectively.

$$Y = \frac{\alpha_{OFF}}{\alpha_{ON} + \alpha_{OFF}} + \frac{2}{\alpha_{ON} + \alpha_{OFF}} \cdot \frac{1}{TSI^3} \cdot \frac{V_p}{GR_0} \cdot \frac{4}{f_{CLK}} \cdot (TM_{ON}f - TSIf) \tag{12}$$

Therefore, a value $PWMR_0$ to be set in PWM register PWMR is evaluated as below.

$$PWMR_0 = \frac{\alpha_{OFF}}{\alpha_{ON} + \alpha_{OFF}} \times 2^{12} + \frac{1}{\alpha_{ON} + \alpha_{OFF}} \cdot \frac{1}{TSI^3} \cdot \frac{V_p}{GR_0} \cdot \frac{2^{15}}{f_{CLK}} (TM_{ON}f - TSIf) \tag{13}$$

When the first term=CBIAS and the coefficients in the second term=PRATE on the right side in equality (13), the following equality (14) is given.

$$PWMR_0 = CBIAS + PRATE\ (TM_{ON}f - TSIf) \tag{14}$$

FIG. 5 also shows ON and OFF timings of a light-on signal Exp of exposure lamp 5 in multi-copying.

Figure 9:
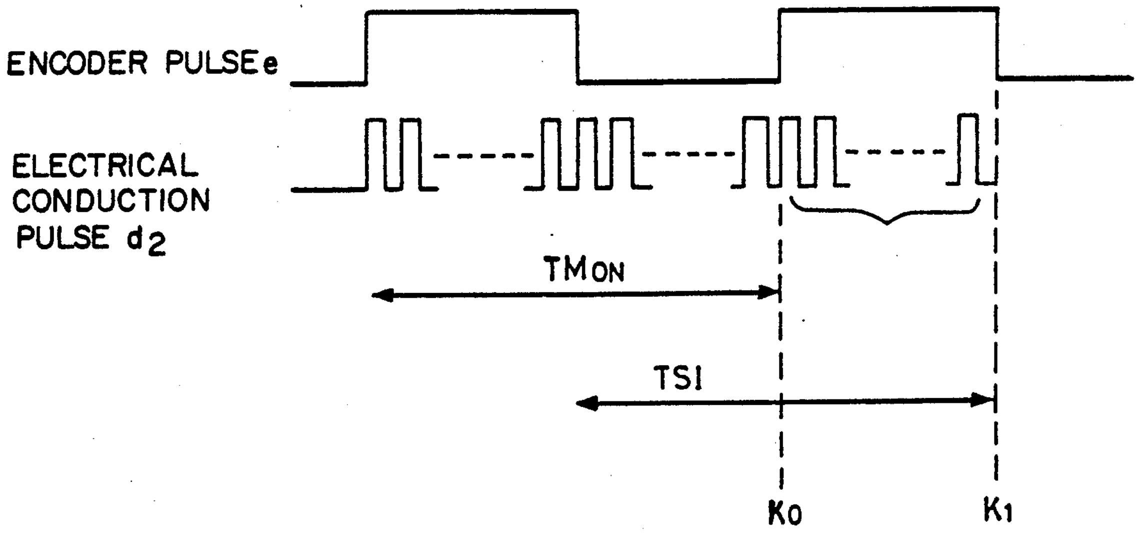
FIG. 9 is a diagram for explaining a timing at which an exposure lamp lights on again according to one embodiment of the present invention.

A description will be given on timing at which exposure lamp 5 lights on again with reference to FIGS. 5 and 9.

Exposure lamp 5 requires a rising time $t_0$ to a predetermined amount of light provided from when light-on signal Exp is turned on to when the amount of light becomes a predetermined amount required for image exposure. Accordingly, light-on signal Exp must be turned on earlier than a scanning start time point by the rising time $t_0$ upon each scanning. In addition, a preliminary scanning time ty required for a preliminary scanning distance between a home position $S_0$ and a scanning start position Ss varies dependently on copying magnification because first moving board 4 moves at a speed corresponding to the copying magnification; however, ty is in general shorter than the rising time $t_0$. Therefore, exposure lamp 5 is required to light on during return operation.

Where tx is a time period obtained by subtracting ty from $t_0$, light-on signal Exp of exposure lamp 5 should only may be turned on at a position Sx where first moving board 4 takes tx time to reach home position $S_0$.

As described above, since preliminary scanning time ty varies depending on copying magnification, the position Sx where light-on signal Exp of exposure lamp 5 is turned on varies depending on the copying magnification. Therefore, the count value xmf of encoder pulse e in FIG. 5 corresponds to the distance from home switch 34.

The control according to this embodiment will now be described in detail with reference to flow charts shown in FIGS. 10A and 12.

Figure 10A:
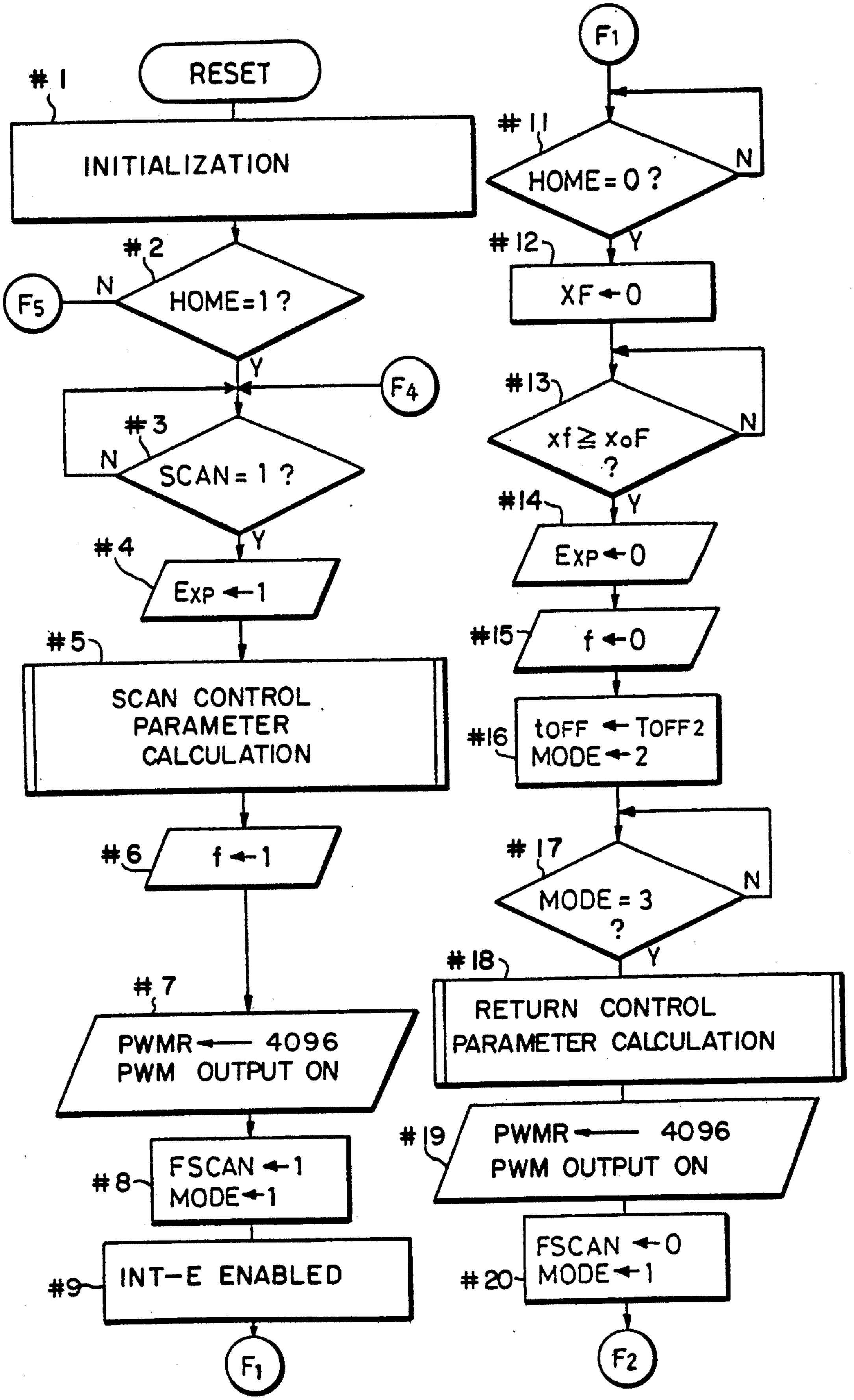
FIGS. 10A, 10B and 10C are flow charts showing a main routine of control by a microcomputer for controlling a scanning system according to one embodiment of the present invention.
Figure 10B:
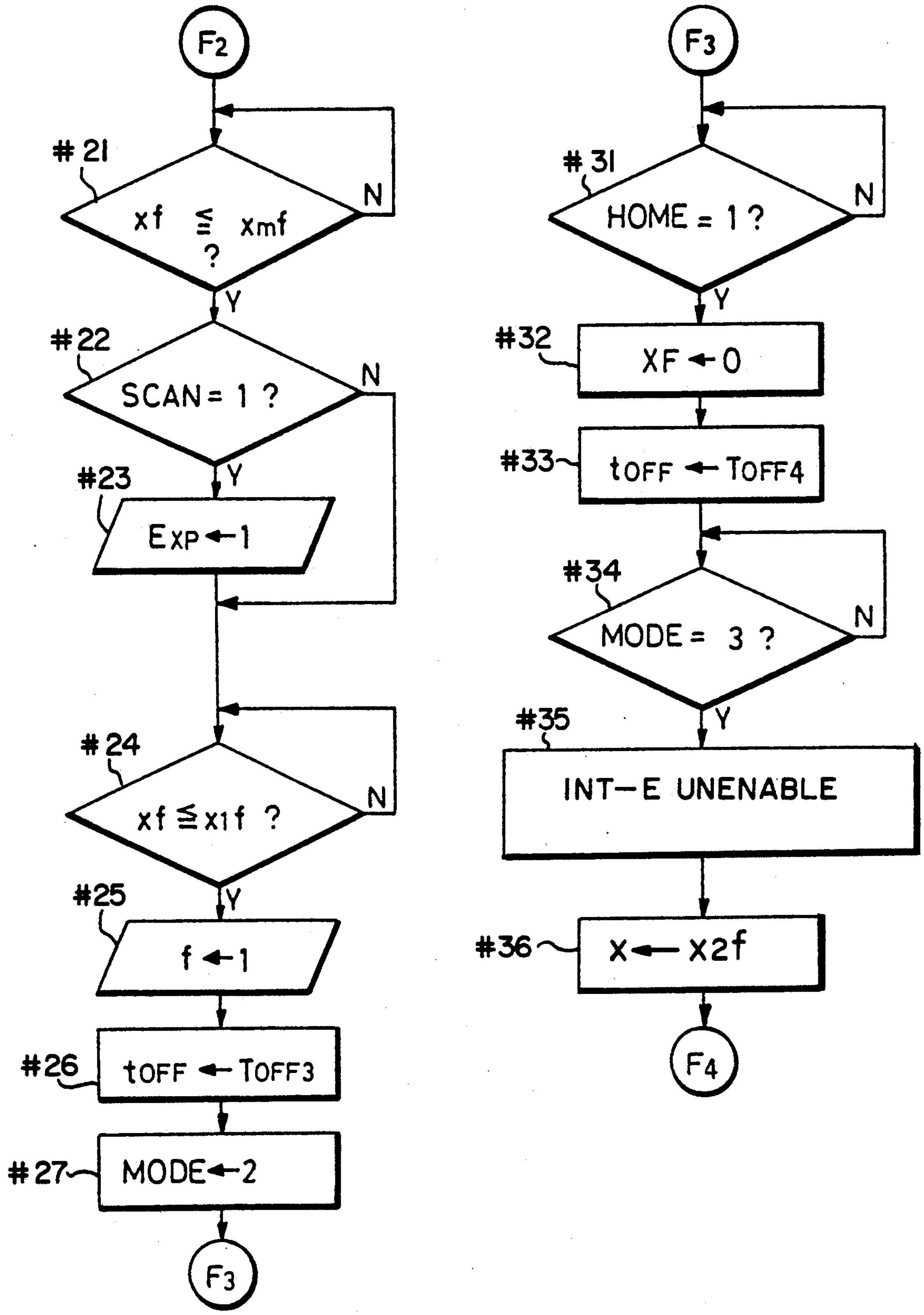
Figure 10C:
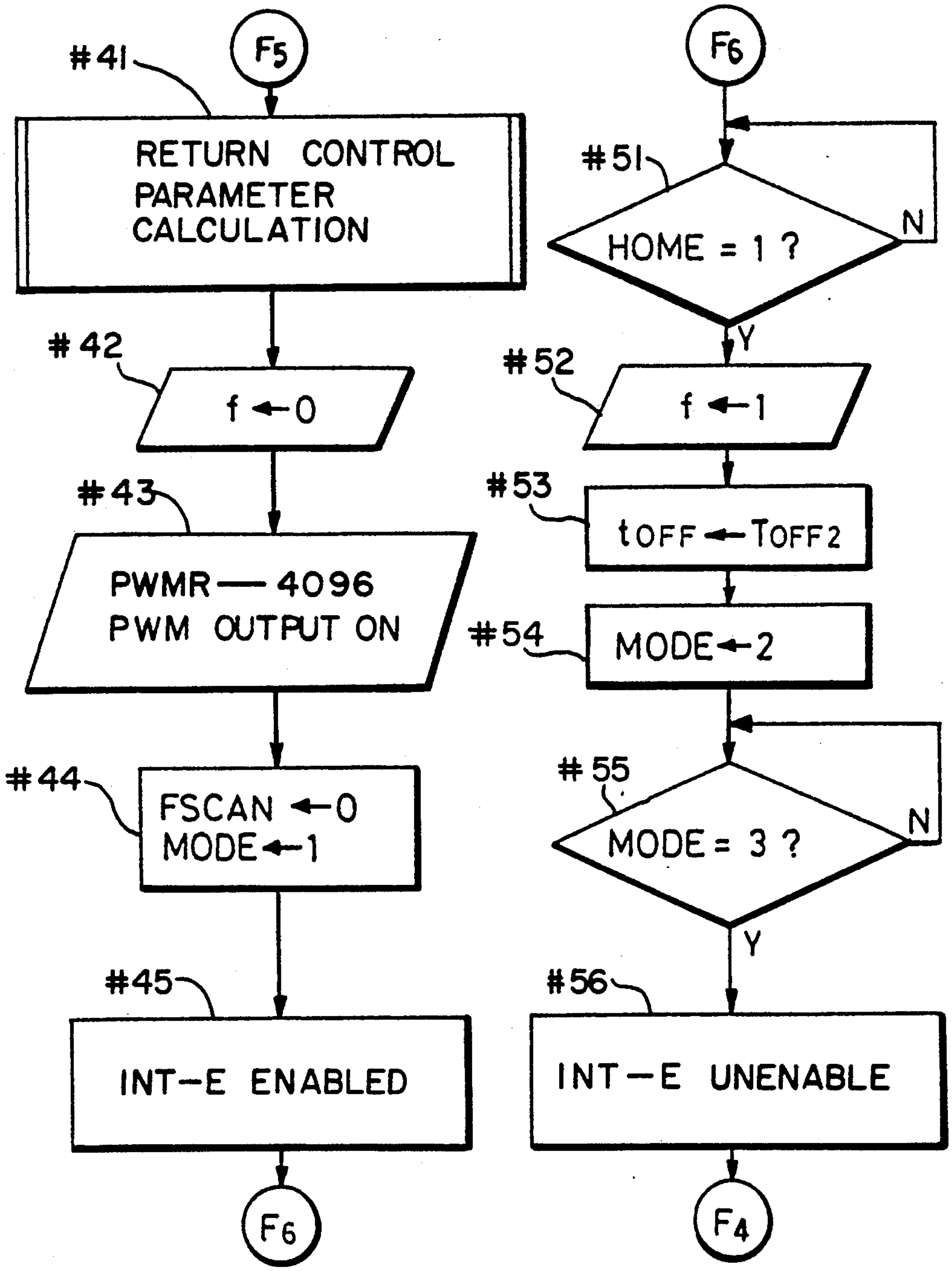

FIGS. 10A-10C show a main routine of control by microcomputer 41.

When a power source is turned on to reset microcomputer 41, an initialization is carried out in step #1. This initialization clears internal RAM44, PWM register PWMR and the like and turns an output state of PWM output port 47 off, to make signal d for rendering the motor electrical conductive attain "0". This state d=0 corresponds to a state where input terminal 35*b* of motor driving circuit of FIG. 3 is at the low level to turn motor 30 off, while d=1 corresponds to a state where the input terminal is at the high level to turn motor 30 on.

A determination is made as to whether or not home switch 34 is ON in step #2 after initialization. With home switch 34 turned on, scanning optical system 3 is at home position, i.e., at the scanning start position, and the processing proceeds to step #3. Microcomputer 42 waits for a scan requesting signal SCAN from the master CPU. When scan requesting signal SCAN is outputted, microcomputer 41 sets a signal Exp for lighting on an exposure lamp to 1 in step #4, so as to light lamp 5. The processing then proceeds to step #5. In step #5, magnification M based on a copying magnification signal MAG is inputted into a memory m. In addition, various parameters required for scanning of encoder pulse width TSIf or the like for controlling scanning speed corresponding to copying magnification are calculated to be stored in RAM 44.

This calculation of TSIf performs counting with a clock of free-run counter FRC used as a reference, and hence the following equality (15) is given.

$$TSIf = \frac{M}{GR_0} \cdot \frac{f_{CLK}}{4} \quad (15)$$

In step #5, the calculation of $x_0f$ is also performed in which a scanning length and a distance from home switch 34 to a braking start time point are determined. The $x_0f$ is obtained by the sum of paper size PSIZE, a length calculated from magnification M and a preliminary scanning amount xHE (a distance from the home switch in the OFF state to the end of an image). The amount a of movement of the encoder pulse from rising to falling and from falling to rising is evaluated from an equality (16) as below.

$$a = \frac{V_p}{2GR_0} \quad (16)$$

The scanning length $x_0f$ converted to a pulse count value in magnification M is given by the following equality (17).

$$x_0f = \frac{xHE}{a} + \frac{PSIZE}{M} \times \frac{1}{a} = \left(xHE + \frac{PSIZE}{M}\right) \cdot \frac{2GR_0}{V_p} \quad (17)$$

Where a distance from home switch 34 to the braking start time point is $x_1$, a pulse count converted value $x_1f$ in the distance of $x_1$ is evaluated by an equality (18) as follows.

$$x_1f = \frac{x_1}{a} = \frac{x_1}{V_p} \cdot 2GR_0 \quad (18)$$

It is now assumed that PSIZE is the maximal size of fed paper in this embodiment. In step #5, a predetermined time $T_{OFF1}$ is set as an OFF time $T_{OFF}$ in acceleration scanning to be inputted into a memory $T_{OFF}$. This is employed in an interruption routine of INT-E.

In the next step #6, a normal/reverse rotation signal f is set to "1". The state f=1 corresponds to a state where input terminal 35*a* of driving circuit 51 of FIG. 3 is at the high level to perform normal rotation, while f=0 corresponds to a state where the input terminal is at the low level to perform reverse rotation.

In step #7, 4096 is set in PWM register PWMR. That is, the OFF time control utilizing PWM output port 47 is carried out with the duty of a pulse for rendering the PWM motor electrically conductive being set to 100%. Also, the output state of PWM output port 47 is turned on, i.e., to the d=1 state to start applying an electric current to motor 30.

In step #8, a flag FSCAN for determining whether or not scanning is underway in an interruption routine is set to 1. This corresponds to a state where the scanning is underway. Further, a control mode of acceleration scanning A is set as MODE←1. In the subsequent step #9, an external interruption INT-E by encoder pulse e is enabled.

In the next step #11, scanning optical system 3 becomes distant from home switch 34, so that home switch 34 is turned off under the control of acceleration scanning A in the initial scanning, and then the processing proceeds to step #12. In step #12, a count value xf of counter XF for measuring a scanning length is cleared to 0. This causes counter XF to count the amount by which scanning optical system 3 has moved since it actually started scanning in accordance with the clear state.

In the subsequent step #13, a determination as to whether scanning optical system 3 scans the calculated scanning length is made by whether or not the count value xf of counter XF reaches the value $x_0f$ corresponding to a predetermined scanning length. When the scanning is terminated ($xf=x_0f$), the processing proceeds to step #14 to make exposure lamp ligthing-on signal Exp attain "0", and to turn lamp 5 off. In the next step #15, a normal/reverse rotation signal f is changed to "0" so as to attain a braking state due to a reverse drive in a normal rotation state.

In the next step #16, a predetermined value $T_{OFF2}$ for determining a braking force is set in a memory $t_{OFF}$ for controlling the OFF time, and also MODE is set to 2 in a control mode of deceleration scanning C.

A change from a deceleration scanning state to an acceleration return state is hereafter carried out in a subroutine of external interruption INT-E.

In step #17, a determination is made in the control mode of deceleration scanning C as to whether or not the motor stops or is inverted, that is, whether or not MODE=3 is attained in the interruption routine, and microcomputer 42 waits for attainment of MODE=3. When MODE=3 is attained in step #17, the processing proceeds to step #18. This is a subroutine in which various parameters required for return control are calculated to be set in RAM 44. For example, such values are calculated as an encoder pulse count value xmf corresponding to a position of first moving board 4 under return for providing the timing at which exposure lamp 5 lights on again in multi-copying corresponding to copying magnification M, an encoder pulse count value $x_1f$ corresponding to a position where a first deceleration return $E_1$ starts, and TSIF for controlling return speed.

Where a time period for which the amount of light becomes a predetermined value after lighting on of exposure lamp 5 is $T_E$ and magnification M in return is MRET, encoder pulse count value xmf is given by the following equality (19).

$$xmf = \left(T_E - \frac{xHE}{V_p} \times M\right) \times \frac{V_p}{MRET} \times \frac{1}{a} \quad (19)$$

Although $x_1f$ is set as an initial value to a value corresponding to a load of scanning optical system 3, the value $x_1f$ is corrected by the amount of movement of first moving board 4 (hereinafter referred to as the amount of over return) after home switch 34 is turned on in return. Where a target value of the initial amount over return is $Ix_2f$, a timing $x'_1f$ at which the next first deceleration return control starts is evaluated from an over return amount $x_2f$ which is attained one scanning cycle before, as shown in the following equality (20).

$$x'_1f = x_1f + (x_2f - Ix_2f) \quad (20)$$

If the timing to first deceleration return control is corrected during multi-copying according to the above equality (20), the constant amount of over return is obtained.

TSIf is calculated similarly to the case of step #5, and data $T_{OFF}$ for controlling the OFF time in the acceleration return control is set.

In the next step #19, the same processing as in step #7 is carried out. Then, the above-described flag FSCAN is reset to 0 (under return), and also the control mode is set to MODE=1.

In step #21, a determination is made as to whether or not xf≦xmf, that is, whether first moving board returns to the position for the timing at which exposure lamp 5 lights on again in multi-copying. If xf≦XMF is satisfied, the processing proceeds to the next step #22. If scan signal SCAN is "1", that is, in the case of multi-copying, exposure lamp lighting-on signal Exp is set to 1 in step #23. If scan signal SCAN is not 1, the processing proceeds to step #24.

In step #24, a determination is made as to whether or not $xf \leqq x_1f$, that is, whether or not first moving board 4 returns to the position for the timing at which the first deceleration return starts. If $xf \leqq x_1f$ is satisfied, normal/reverse rotation signal f is set to 1 in step #25, and in step #26, an extremely long time period $T_{OFF3}$ ($T_{OFF3} >> T_{STOP}$) is inputted in memory $t_{OFF}$ as OFF time control data $T_{OFF}$ in the control of first deceleration return $E_1$. In the subsequent step #27, the control mode is set to MODE=2.

In the subsequent step #31, a determination is made as to whether first moving board 4 returns to home position. If the first moving board returns to the home position, encoder pulse counter XF is cleared to 0 to make a preparation for evaluating $x_2f$ in an interruption routine in step #32. In step #33, $T_{OFF4}$ is set in memory $t_{OFF}$ as OFF time control data $T_{OFF}$ in the control of second deceleration return $E_2$, so as to obtain a forcible braking state.

In step #34, microcomputer 41 waits for MODE=3 similarly to the case of step #17. When MODE=3, the processing proceeds to step #35 to prohibit the external interruption of INT-E and, in step #36, encoder pulse count value xf is stored in a memory X as $x_2f$ to terminate one-time forward and backward operation. Returning to step #3 again, the same processing as described above is repeated.

When home switch 34 is OFF in step #2, i.e., HOME=0, the processing proceeds to step #41 to set magnification M to a predetermined low speed return magnification. Also, the calculation of TSIF corresponding to magnification M and the setting of OFF time control data $T_{OFF}$ are carried out similarly to the case of step #18. Calculation of xmf and $x_1f$, however, is not carried out now. Normal/reverse rotation signal f is changed to 0 in step #42. The same processing as in step #7 is carried out in step #43, and the same processings as those in steps #20 and #9 are carried out in steps #44 and #45. When home switch 34 is turned on in the next step #51, i.e., HOME=1, the processings in steps #52–56 are carried out. Then, the processing proceeds to step #3 to perform the same processings as described above.

Figure 11A:
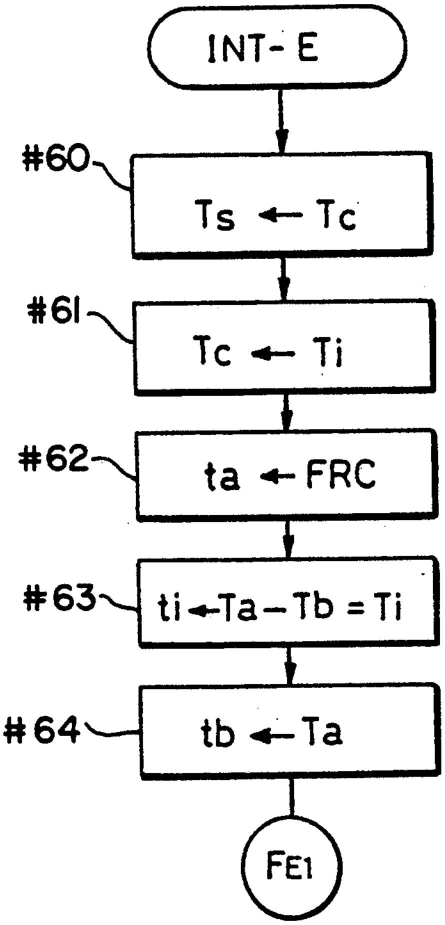
FIGS. 11A, 11B and 11C are flow charts showing sub-routines of an external interruption INT-E according to one embodiment of the present invention.
Figure 11B:
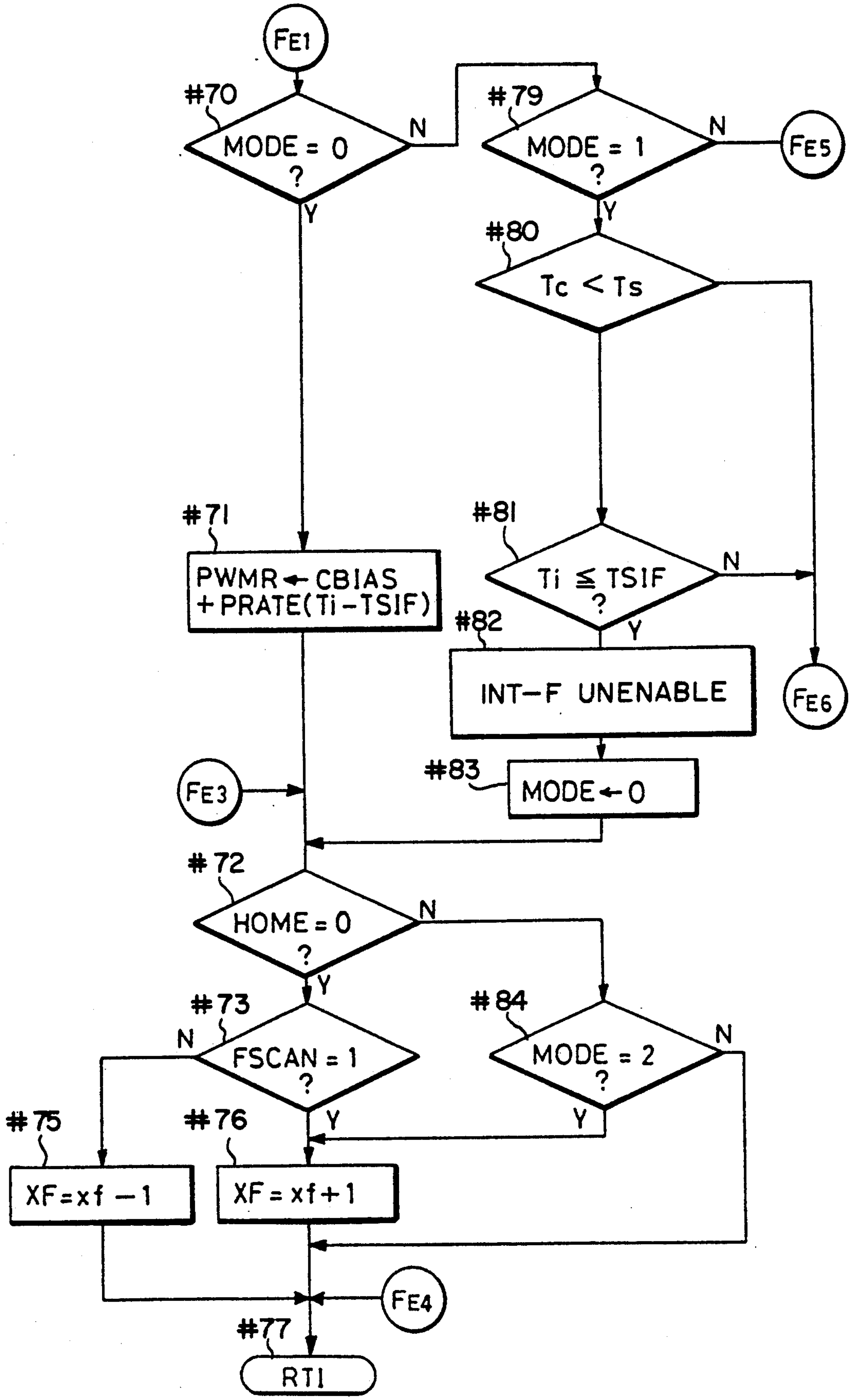
Figure 11C:
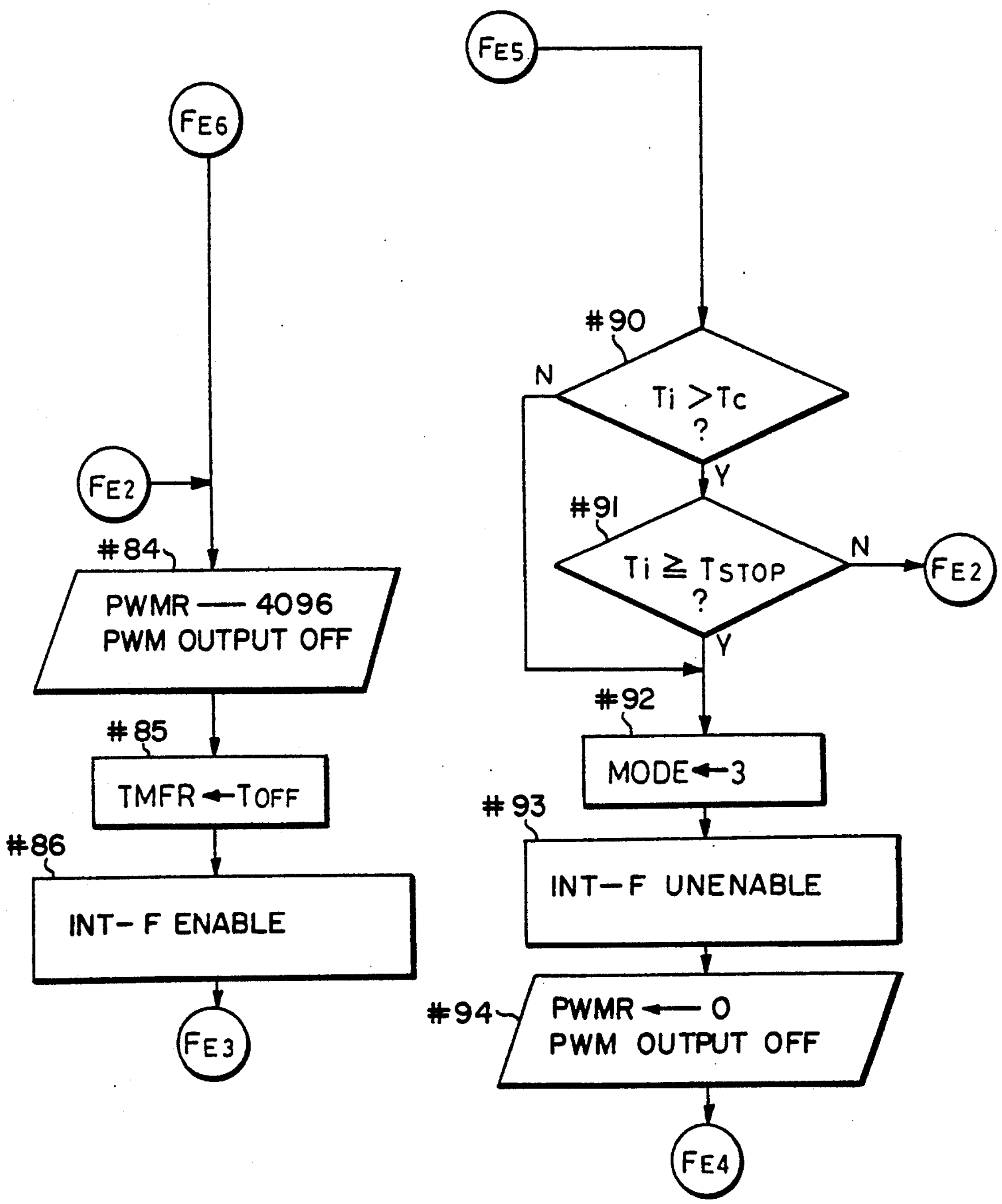

A description will now be given on the subroutine of the external interruption INT-E by encoder pulse d shown in FIGS. 11A–11C. This routine is generated at both of ON and OFF edges of encoder pulse e. The external interruption INT-E is generated only when an interruption permission "INT-E enabled" is set, and it is not generated when an interruption prohibition "INT-E unenabled" is set.

With the interruption INT-E generated, the pulse width stored in memory Tc is first stored in memory Ts in step #60, and thereafter the width Ti of previous pulse is stored in memory Tc in step #61. Then, contents Ta of free-run counter FRC to be a present time signal is stored in a memory ta at a predetermined position in RAM 44. In step #63, a value Ti obtained by subtracting a previous encoder interruption time Tb from the contents Ta of memory ta ($Ta - Tb = Ti$) is stored in a pulse width measuring memory ti.

In the subsequent step #64, the contents Ta is stored in a memory tb for measuring a pulse width in the next interruption.

A determination is then made on mode in step #70. If the mode is a constant speed control mode (MODE=0), the processing proceeds to step #71. If the mode is an acceleration control mode (MODE 1), the processing proceeds from step #79 to #80. If the mode is a deceleration control mode (MODE 2), the processing proceeds to step #90. When MODE=0, calculation of a PWM register set value in constant speed control is carried out according to the above equality (14), so as to set the calculated value in PWM register PWMR in step #71. In the next step #72, a determination is made as to whether or not home switch 34 is turned on. Unless first moving board 4 is at the home position, a determination is made as to whether or not FSCAN=1 in step #73.

If the scanning is underway, the count value xf of pulse counter xf is incremented in step #76. If the return is underway, the count value xf is decremented in step #75. The processing returns from the interruption to the main routine in step #77. If first moving board 4, is at the home position in step #72, the processing proceeds to step #74. If the mode is MODE=2, i.e., deceleration mode, the processing in step #76 is carried out, and unless otherwise, the processing makes a return.

When MODE=1 in step #79, a determination is made in step #81 as to whether or not the width Ti of encoder pulse e is Ti≦TSIF, that is, whether or not the measured width Ti is equal to or smaller than a pulse width to be a target, on condition that such acceleration state takes place where the value stored in memory Tc is lower than that stored in memory Ts, that is, the pulse width is decreased. If Ti≦TSIF, "INT-F unenabled" prohibiting an interruption INT-F caused by an internal timer is set in step #82, and in step #83, the mode is changed to the constant speed control mode with MODE=0, then transferring to and after step #72.

Unless Ti≦TSIf in step #81, the processing transfers to step #84 so as to set 4096 in PWM register PWMR and set the duty of the pulse d for rendering the PWM motor electrically conductive to 100%, and then turns an output of PWM output port 47 off. Then, a timer value $T_{OFF}$ provided before the preparation for OFF time control starts is set in a timer F register TMFR of timer unit 49. The interruption INT-F of the internal timer is then enabled in the next step #86, and the processing proceeds to steps #72. Thereafter, the same processings as those in the above case are carried out.

Unless MODE=1 in step #79, MODE=2 is set, and then the processing proceeds to step #90. A determination is now made as to whether Ti>Tc, i.e., deceleration is underway. If the deceleration is underway (when the width of encoder pulse e measured at the present time becomes larger than that in previous time), a determination is made as to whether $Ti \leqq T_{STOP}$, i.e., whether or not motor 30 can be regarded as a stopped state, in step #91. If $Ti \leqq T_{STOP}$, the processing proceeds to step #92. In case where acceleration is underway in step #90, a determination is made that the direction of rotation of motor 30 is inverted, and then the processing proceeds to step #92. Unless $Ti \geqq T_{STOP}$ in step #91, the processing proceeds to step #84 to continue the OFF time control under deceleration control.

In step #92, the control mode is set to be MODE=3 with the second deceleration return control regarded as terminated. This is used for a determination on the stop of motor 30 in the main routine.

In the subsequent step #93, "INT-F unenabled" prohibiting the internal timer interruption INT-F is set. In step #94, PWM register PWMR is cleared to 0, and PWM output port 47 is turned off. Then, the processing reaches step #77 to return to the main routine.

Figure 12:
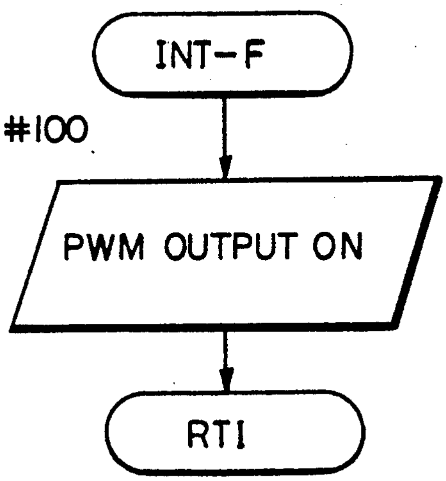
FIG. 12 is a flow chart showing a sub-routine of an internal interruption INT-F according to one embodiment of the present invention.
Figure 13A:
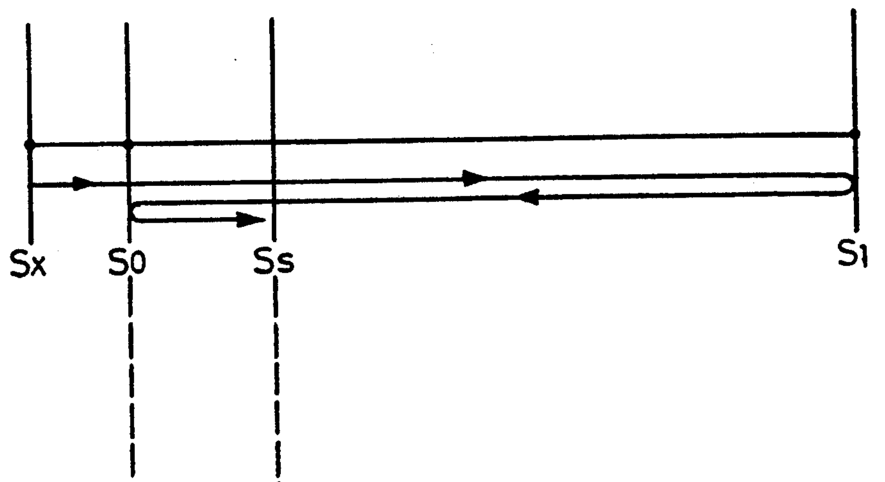
FIGS. 13A, 13B and 13C show one example of circumstances of movement of a conventional scanning system.
Figure 13B:
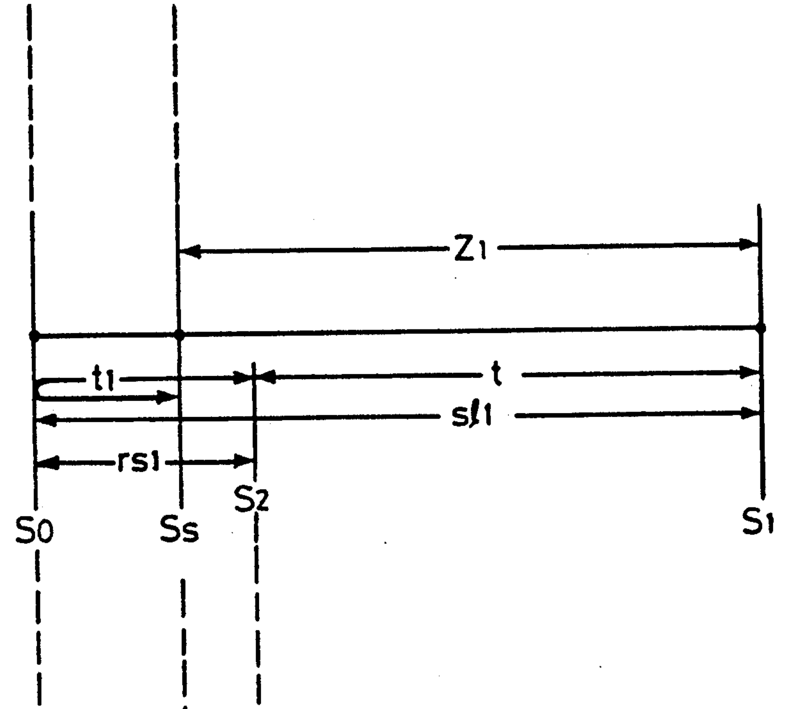
Figure 13C:
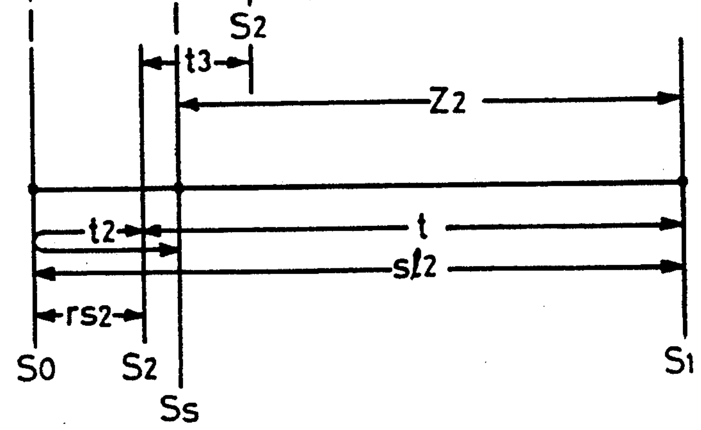
Figure 14A:
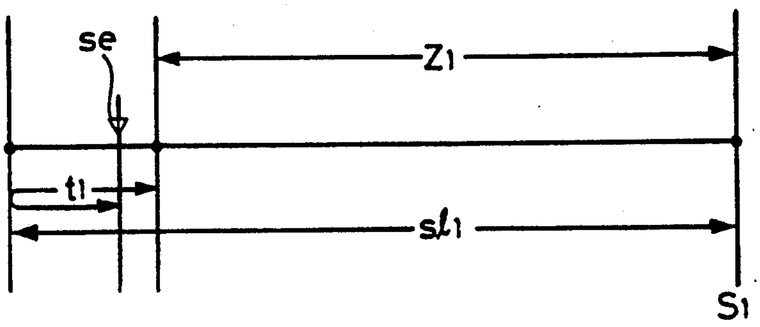
FIGS. 14A and 14B show another example of circumstances of movement of the conventional scanning system.
Figure 14B:
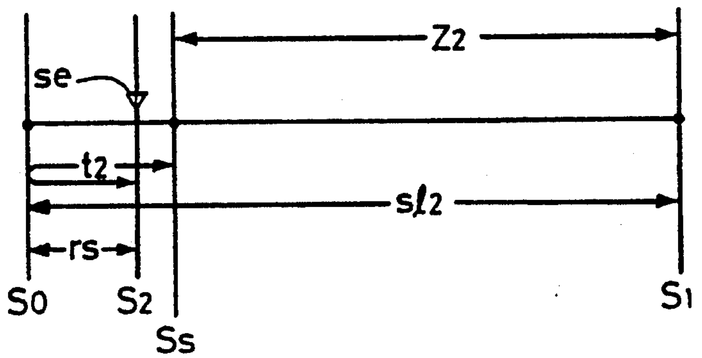

FIG. 12 shows a subroutine of the internal interruption INT-F by internal timer TMF. The internal interruption INT-F is generated when a reference clock is counted by a count value set in TMF register TMFR in a state where an interruption permission "INT-F enabled" is set. In step #100, PWM output port 47 is changed from the OFF state to the ON state, and then the processing returns to the main routine.

According to the present invention, for the repetitive and continuous image exposure to be carried out by the scanning system driven forward and backward, the exposure lamp once lights off every time the scanning is terminate and lights on again for the next scanning when the scanning system moving backward reaches a predetermined position determined corresponding to copying magnification. The timing at which the exposure lamp lights on again can be set if the scanning system reaches a predetermined position where the scanning system moving backward is not affected by copying size. Furthermore, the fluctuation of time, which is required between timing of the exposure lamp lighting on again and the start of the scanning, depending on change of the scanning speed corresponding to copy magnification can be absorbed by adjusting the predetermined position in accordance with the copy magnification.

Therefore, it is possible to light on the exposure lamp again in the minimal margin required to enable the exposure lamp to sufficiently rise at the time point when each image scanning starts even on any copying conditions. Also, it is possible to avoid an extra increase in temperature of the platen glass or a vain power consumption without causing a failure in image exposure resulting from delay in rising of the exposure lamp.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying apparatus in which a plurality of sheets can be continuously copied on a record medium, comprising:

original holding means having a platen for placing an original thereon;

illuminating means for illuminating the original;

image forming means receiving reflected light from the original for reproducing an image of the original on said record medium;

scanning means moving in a first direction for scanning the original and moving in a second direction for returning to a predetermined position;

magnification specifying means for specifying a copying magnification at which the original is reproduced on said record medium;

projecting means for variable-scale magnifying an image of the original being scanned at said specified magnification to introduce the variable-scale magnified image into said image forming means;

driving means for driving said scanning means and also driving said scanning means to move in said first direction at difference speeds in correspondence with said specified magnification;

first control means for making said illuminating means light on when moving in said second direction and light off when the scanning of the original is terminated; and second control means for determining based on said specified copying magnification a timing at which said first control means makes said illuminating means light on.

2. The copying apparatus according to claim 1, wherein said projecting means has a scanning mirror for introducing reflected light from the illuminated original in a predetermined direction, and said illuminating means and said scanning mirror are formed integrally.

3. The copying apparatus according to claim 1, further comprising detecting means for detecting a moving position of said scanning means; wherein said driving means includes a motor and an operation circuit for making said motor operative in both normal and reverse directions, and said detecting means detects a moving distance of said scanning means based on the direction of and the number of revolutions of said motor.

4. An image scanning apparatus capable of continuously scanning an original plural times, comprising:

original holding means for placing the original thereon;

illuminating means for illuminating the original;

magnification specifying means for specifying a copying magnification at which the original is projected onto a projection plane;

projecting means for projecting an image of said illuminated original onto the projection plane at said specified magnification;

moving means for moving said illuminating means in order to scan the original, said moving means having a first moving mode for scanning the original and a second moving mode in which said illuminating means returns to a predetermined position;

first control means for making said illuminating means light on before the scanning of the original starts and light off when the scanning of the original is terminated; and second control means for, when a continuous scanning is set, making said illuminating means light on at a timing corresponding to a projecting magnification of said projecting means when said moving means is operating in said second moving mode.

5. The image scanning apparatus according to claim 4, wherein said moving means alters a moving speed of said illuminating means based on said magnification specified by said magnification specifying means.

6. The image scanning apparatus according to claim 4, wherein said projecting means has a scanning member including a scanning mirror;

said illuminating means is attached to said scanning member; and said moving means moves said scanning member so as to scan the original.

7. The image scanning apparatus according to claim 4, wherein a moving speed in said first moving mode changes based on the projecting magnification of said projecting means.

8. The image scanning apparatus according to claim 4, further comprising:

detecting means for detecting a moving position of said illuminating means based on the direction of and the number of revolutions of a motor included in said moving means; wherein a timing at which said illuminating means lights on again is determined by said detected moving position.

9. An image scanning apparatus capable of continuously scanning an original plural times, comprising:

original holding means having a platen on which the original is scanned;

illuminating means for illuminating the original;

scanning means for scanning the original;

magnification specifying means for specifying a projecting magnification at which the original projected onto a projection plane;

projecting means for projecting an image of said illuminated original onto the projection plane at said specified magnification;

moving means for relatively moving the original and said scanning means in order to scan the original, said moving means having a first moving mode for scanning the original and a second moving mode for returning the original and said scanning means to a predetermined position after moving the original and said scanning means in said first moving mode;

first control means for making said illuminating means light on before the scanning of the original starts and light off when the scanning of the original is terminated; and second control means for making said illuminating means light on at a timing corresponding to a projecting magnification of said projecting means when said moving means is operating in said second moving mode.

10. The image scanning apparatus according to claim 9, wherein said scanning means includes said illuminating means and a reflecting member which is a portion of said projecting means; and said moving means moves said scanning means.

11. The image scanning apparatus according to claim 9, further comprising automatic original feeding means for transporting the original circulatively; wherein said moving means moves the original to cause said scanning means to scan the original.

12. The image scanning apparatus according to claim 11, wherein the timing at which said illuminating means lights on is a time point when an end of the original reaches a predetermined position to be determined by a projecting magnification.

13. The image scanning apparatus according to claim 9, further comprising detecting means for detecting a relatively moving distance moved by said moving means; wherein said moving means has a motor to which an encoder is connected, and said detecting means detects said moving distance based on the number of revolutions of said motor detected by said encoder.

14. The image scanning apparatus according to claim 9, wherein said moving means alters a moving speed in said first moving mode based on the magnification specified by said magnification specifying means.

15. An image scanning apparatus capable of projecting an original onto a projection plane at a plurality of magnifications and capable of continuously scanning the original, comprising:

a platen for placing the original thereon;

illuminating means lighting on in response to a scanning start instruction for illuminating the original;

scanning means for scanning the original at first speed and second speed different from said first speed;

moving means having a first moving mode for moving said scanning means in order to scan the original and a second moving mode for returning said scanning means to a predetermined position;

detecting means for detecting a moving position of said scanning means;

first control means for, in case where a first speed is set for scanning of the original, making said illuminating means light off when the scanning is terminated, and making said illuminating means light on again when said scanning means reaches a first position when moving in said second moving mode; and second control means for, in case where a second speed is set for scanning of the original, making said illuminating means light off when the scanning is terminated, and making said illuminating light on again when said scanning means reaches a second position different from said first position when moving in said second moving mode.

16. The image scanning apparatus according to claim 15, further comprising magnification specifying means for specifying a projecting magnification at which the original is projected onto a projection plane, and third control means for controlling said moving means so as to select said first speed when a first magnification is specified and select said second speed when a second magnification is specified.

17. The image scanning apparatus according to claim 15, wherein said scanning means includes said illuminating means and a scanning mirror for introducing an image of the original to the projection plane, said illuminating means and said scanning mirror integrally formed, and said moving means moves said scanning means at a plurality of speeds.

18. The image scanning apparatus according to claim 15, wherein said moving means includes a motor and alters the scanning speed of said scanning means by altering the revolution speed of said motor, and said detecting means detects the moving position of said moving means based on the direction of and the number of revolutions of said motor.

19. A method of controlling an image scanning in an image scanning apparatus capable of scanning an original to exposure the original on a projection plane at a plurality of magnifications and capable of continuously scanning the original plural times, said method comprising the steps of:

making illuminating means light on during a backward movement for returning scanning means to a predetermined position and making said illuminating means light off at the same time when the scanning is terminated; and evaluating a timing for said illuminating means to light on based on a set magnification.

20. A method of controlling an image scanning in an image scanning apparatus including light emitting means for illuminating an original and scanning means for scanning the original at first speed and second speed different from said first speed and capable of continuously scanning the originals, said method comprising the steps of:

making said light emitting means light on when the original is being scanned and light off when the scanning is terminated;

returning scanning means by which the scanning is to a predetermined position when said scanning means terminates scanning;

in case of continuously scanning the original at the first speed, making said light emitting means light on again when said scanning means reaches a first position during a return operation; and in case of continuously scanning the original at the second speed, making said light emitting means light on again when said scanning means reaches a second position different from the first position during the return operation.

21. The method of claim 20, further comprising the steps of:

selecting the first speed when a first magnification is specified; and selecting the second speed when a second magnification is specified.

22. An image scanning apparatus capable of continuously scanning an original plural times, comprising:

a platen on which the original is placed; illuminating means generating a predetermined amount of light after a definite time period has passed since said illuminating means lighted on illuminating the original with said predetermined amount of light;

scanning means for scanning the original while moving said illuminating means; and control means for making said illuminating means light off when said scanning means terminates the scanning of the original, and for controlling a timing for said illuminating means to light on so that said illuminating means may generate said predetermined amount of light when said scanning means starts re-scanning of the original.

23. A method of continuously scanning an original plural times comprising the steps of:

scanning the original while illuminating the original after making illuminating means light on to generate a predetermined amount of light;

making said illuminating means light off after terminating the scanning of the original; and making said illuminating means light on while moving said illuminating means in preparation for the re-scanning of the original so that said illuminating means may generate said predetermined amount of light when the re-scanning of the original starts.

* * * * *